(12) United States Patent
Vaisband et al.

(10) Patent No.: US 9,785,161 B2
(45) Date of Patent: Oct. 10, 2017

(54) HETEROGENEOUS METHOD FOR ENERGY EFFICIENT DISTRIBUTION OF ON-CHIP POWER SUPPLIES AND POWER NETWORK ON-CHIP SYSTEM FOR SCALABLE POWER DELIVERY

(71) Applicants: Inna Vaisband, Rochester, NY (US); Eby G. Friedman, Rochester, NY (US)

(72) Inventors: Inna Vaisband, Rochester, NY (US); Eby G. Friedman, Rochester, NY (US)

(73) Assignee: University of Rochester, Rochester, NY (US)

( * ) Notice: Subject to any disclaimer, the term of this patent is extended or adjusted under 35 U.S.C. 154(b) by 242 days.

(21) Appl. No.: 14/833,805

(22) Filed: Aug. 24, 2015

(65) Prior Publication Data

US 2017/0060151 A1 Mar. 2, 2017

(51) Int. Cl.
| | | |
|---|---|---|
| *G05B 11/01* | (2006.01) | |
| *G05F 1/46* | (2006.01) | |
| *G06F 1/32* | (2006.01) | |
| *G06F 1/26* | (2006.01) | |

(52) U.S. Cl.
CPC .................. *G05F 1/46* (2013.01); *G06F 1/26* (2013.01); *G06F 1/3243* (2013.01)

(58) Field of Classification Search
CPC .................................. G05F 1/46; G06F 1/3243
See application file for complete search history.

(56) References Cited

U.S. PATENT DOCUMENTS

| | | | | |
|---|---|---|---|---|
| 2006/0095874 A1* | 5/2006 | Jiang | ................... | G06F 17/5077 716/109 |
| 2007/0033562 A1* | 2/2007 | Correale | ............. | G06F 17/5068 257/773 |
| 2008/0129324 A1* | 6/2008 | Pastel | ................ | G01R 31/3008 324/762.02 |
| 2011/0001249 A1* | 1/2011 | Law | ...................... | H01L 23/481 257/776 |

OTHER PUBLICATIONS

Gupta, Efficient Design and Analysis of Robust Power Distribution Meshes, 2006, IEEE.*

(Continued)

*Primary Examiner* — Mark Connolly
(74) *Attorney, Agent, or Firm* — Harris Beach PLLC

(57) ABSTRACT

A heterogeneous power distribution system for an integrated circuit includes a power network-on-chip that receives electrical power from one or more off-chip power converters. The power network-on-chip includes a mesh of power routers to power a plurality of on-chip loads. The mesh of power routers includes a plurality of integrated simple routers and a plurality of integrated complex power routers. Each complex power router of the plurality of complex power routers includes a microcontroller which is communicatively coupled to one or more switches and one or more sensors of the complex power router. The microcontroller is configured to run a process algorithm that dynamically routes and controls power according to a power delivery policy by controlling the one or more switches based on information received from the one or more sensors. A method to determine a near optimal distribution of power supply resources in a heterogeneous power delivery system is also described.

20 Claims, 28 Drawing Sheets

(56) References Cited

OTHER PUBLICATIONS

Foley, Raymond et al., "Technology Roadmapping for Power Supply in Package (PSiP) and Power Supply on Chip (PwrSoC)," 2010 Proceedings of the IEEE Applied Power Electronics Conference and Exposition (pp. 525-532).

Kose, S. et al., "Distributed Power Network Co-Design with On-Chip Power Supplies and Decoupling Capacitors," 2011 Proceedings of the ACM/IEEE International Workshop on System Level Interconnect Prediction (SLIP) (5 pages).

Kose S. et al., "Distributed On-Chip Power Delivery," 2012 IEEE Journal on Emerging and Selected Topics in Circuits and Systems, vol. 2, No. 4 (pp. 704-713).

Kose S. et al., "Simultaneous Co-Design of Distributed On-Chip Power Supplies and Decoupling Capacitors," 2010 Proceedings of the IEEE International SoC Conference (pp. 15-18).

Kose S. et al., "An Area Efficient On-Chip Hybrid Voltage Regulator," 2012 Proceedings of the IEEE International Symposium on Quality Electronic Design (pp. 398-403).

Kursun V. et al., "Analysis of Buck Converters for On-Chip Integration with a Dual Supply Voltage Microprocessor," 2003 IEEE Transactions on Very Large Scale Integration (VLSI) Systems, vol. 11, No. 3 (pp. 514-522).

Kursun V. et al., "High Input Voltage Step-Down DC-DC Converters for Integration in a Low Voltage CMOS Process," 2004 Proceedings of the IEEE International Symposium on Quality Electronics Design (pp. 517-521).

Al-Shyoukh M. et al., "A Transient-Enhanced Low-Quiescent Current Low-Dropout Regulator with Buffer Impedance Attenuation," 2007 IEEE Journal of Solid-State Circuits, vol. 42 No. 8 (pp. 1732-1742).

Man, T.Y. et al., "Development of Single-Transistor-Control LDO Based on Flipped Voltage Follower for SoC," 2008 IEEE Transactions on Circuits and Systems I: Regular Papers, vol. 55, No. 5 (pp. 1392-1401).

Hazucha, P. et al., "Area-Efficient Linear Regulator with Ultra-Fast Load Regulation," 2005 IEEE Journal of Solid-State Circuits, vol. 40, No. 4 (pp. 933-940).

Guo J. et al., "A 6-µW Chip-Area-Efficient Output-Capacitorless LDO in 90-nm CMOS Technology," 2010 IEEE Journal of Solid-State Circuits, vol. 45, No. 9 (pp. 1896-1905).

Wens M. et al., "A Fully Integrated CMOS 800-mW Four-Phase Semiconstant ON/OFF-Time Step-Down Converter," 2011 IEEE Transactions on Power Electronics, vol. 26, No. 2 (pp. 326-333).

Nam H. et al., "5-V Buck Converter Using 3.3-V Standard CMOS Process With Adaptive Power Transistor Driver Increasing Efficiency and Maximum Load Capacity," 2012 IEEE Transactions on Power Electronics, vol. 27, No. 1 (pp. 463-471).

Wang L. et al., "Improving Light and Intermediate Load Efficiencies of Buck Converters With Planar Nonlinear Inductors and Variable On Time Control," 2012 IEEE Transactions on Power Electronics, vol. 27, No. 1 (pp. 342-353).

Yan W. et al., "A Noise-Shaped Buck DC-DC Convertwer with Improved Light-Load Efficiency and Fast Transient Response," 2011 IEEE Transactions on Power Electronics, vol. 26, No. 12 (pp. 3908-3924).

Jia H. et al., "Integration of a Monolithic Buck Converter Power IC and Bondwire Inductors with Ferrite Epoxy Glob Cores," 2011 IEEE Transactions on Power Electronics, vol. 26, No. 6 (pp. 1627-1630).

Lee Y.-H. et al., "Power-Tracking Embedded Buck-Boost Converter with Fast Dynamic Voltage Scaling for the SoC System," 2012 IEEE Transactions on Power Electronics, vol. 27, No. 3 (pp. 1271-1282).

Ahn Y. et al., "A 50-MHz Fully Integrated Low-Swing Buck Converter Using Packaging Inductors," 2012 IEEE Transactions on Power Electronics, vol. 27, No. 10 (pp. 4347-4356).

Bathily M. et al., "A 200-MHz Integrated Buck Converter With Resonant Gate Drivers for an RF Power Amplifier," 2012 IEEE Transactions on Power Electronics, vol. 27, No. 2 (pp. 610-613).

Ramadass Y. et al., "A Fully-Integrated Switched-Capacitor Step-Down DC-DC Converter With Digital Capacitance Modulation in 45 nm CMOS," 2010 IEEE Journal of Solid-State Circuits, vol. 45, No. 12 (pp. 2557-2565).

Le H.-P. et al., "Design Techniques for Fully Integrated Switched-Capacitor DC-DC Converters," 2011 IEEE Journal of Solid-State Circuits, vol. 46, No. 9 (pp. 2120-2131).

O'Mathuna C. et al., "Review of Integrated Magnetics for Power Supply on Chip (PwrSoC)." 2012 IEEE Transactions on Power Electronics, vol. 27, No. 11 (pp. 4799-4816).

Fu W. et al., "A Feasibility Study of High-Frequency Buck Regulators in Nanometer CMOS Technologies," 2009 Proceedings of the IEEE Dallas Circuits and Systems Workshop (pp. 1-4).

Dreslinski, R.G. et al., "Near-Threshold Computing: Reclaiming Moore's Law through Energy Efficient Integrated Circuits," 2010 Proceedings of the IEEE, vol. 98, No. 2 (pp. 253-266).

Okuma, Y. et al., "0.5-V Input Digital LDO with 98.7% Current Efficiency and 2.7-µA Quiescent Current in 65nm CMOS," 2010 Proceedings of the IEEE Custom Integrated Circuits Conference (4 pages).

Hirairi K. et al., 13% Power Reduction in 16b Integer Unit in 40nm CMOS by Adaptive Power Supply Voltage Control with Parity-Based Error Prediction and Detection (PEPD) and Fully Integrated Digital LDO, 2012 Proceedings of the IEEE International Solid-State Circuits Conference (pp. 486-488).

Urgaonkar R. et al., Dynamic Resource Allocation and Power Management in Virtualized Data Centers, 2010 Proceedings of the IEEE Network Operations and Management Symposium (pp. 479-486).

Hazucha P. et al., "A 233-MHz 80%-87% Efficient Four-Phase DC-DC Converter Utilizing Air-Core Inductors on Package," 2005 IEEE Journal of Solid-State Circuits, vol. 40, No. 4 (pp. 838-845).

Kim J. et al., "Chip-Package Hierarchical Power Distribution Network Modeling and Analysis Based on a Segmentation Method," 2010 IEEE Transactions on Advanced Packaging, vol. 33,, No. 3 (pp. 647-659).

Kose S. et al., "Active Filter-Based Hybrid On-Chip DC-DC Converter for Point-of-Load Voltage Regulation," 2013 IEEE Transactions on Very Large Scale Integration (VLSI) Systems, vol. 21, No. 4 (pp. 680-691).

Nassif S.R., "Power Grid Analysis Benchmarks," 2008 Proceedings of the IEEE/ACM Asia and South Pacific Design Automation Conference (pp. 376-381).

Popovich M. et al., Effective Radii of On-Chip Decoupling Capacitors, 2008 IEEE Transactions on Very Large Scale Integration (VLSI) Systems, vol. 16, No. 7 (pp. 894-907).

Restle P.J. et al., A Clock Distribution Network for Microprocessors, 2001 IEEE Journal of Solid-State Circuits, vol. 36, No. 5 (pp. 792-799).

Vaisband I. et al., "Heterogeneous Methodology for Energy Efficient Distribution of On-Chip Power Supplies," 2013 IEEE Transactions on Power Electronics, vol. 28, No. 9 (pp. 4267-4280).

\* cited by examiner

HETEROGENEOUS METHOD FOR ENERGY EFFICIENT DISTRIBUTION OF ON-CHIP POWER SUPPLIES AND POWER NETWORK ON-CHIP SYSTEM FOR SCALABLE POWER DELIVERY

STATEMENT REGARDING FEDERALLY FUNDED RESEARCH OR DEVELOPMENT

This invention was made with government support under CCF-1329374 awarded by the National Science Foundation. The government has certain rights in the invention.

CROSS-REFERENCE TO RELATED APPLICATIONS

This application claims priority to and the benefit of U.S. provisional patent application Ser. No. 62/042,572, HETEROGENEOUS METHOD FOR ENERGY EFFICIENT DISTRIBUTION OF ON-CHIP POWER SUPPLIES AND POWER NETWORK ON-CHIP SYSTEM FOR SCALABLE POWER DELIVERY, filed Aug. 27, 2014, which application is incorporated herein by reference in its entirety.

FIELD OF THE APPLICATION

The invention relates to a power delivery system for an integrated circuit and particularly to a system that delivers power more efficiently to the on-chip circuitry of an integrated circuit and a method to design such a system.

BACKGROUND

In the background, other than the bolded paragraph numbers, non-bolded square brackets ("[ ]") refer to the citations listed hereinbelow.

The delivery of high quality power to the on-chip circuitry with minimum energy loss is a fundamental requirement of all integrated circuits (ICs). To supply sufficient power, a higher unregulated DC voltage is usually stepped down and regulated within the power delivery system W. Power conversion and regulation resources should be efficiently managed to supply high quality power with minimum energy losses within multiple on-chip voltage domains [2].

SUMMARY

According to one aspect, a power network on-chip (PNoC) for an integrated circuit includes one or more voltage clusters. Each voltage cluster includes a plurality of locally powered loads. A plurality of power routers is disposed in a mesh circuit topology as a mesh of power routers, the mesh of power routers is configured to receive power from one or more power converters. Each of the power routers is electrically coupled to and configured to power a locally powered load. Adjacent power routers of the plurality of power routers are electrically coupled to each other via a switch of a plurality of switches. At least one programmable unit communicatively is coupled to the plurality of switches. The programmable unit is adapted to manage power delivery to the locally powered loads of the one or more voltage clusters by configuring a switch position of at least a subset of switches of the plurality of switches based on sensed voltages and currents within the one or more voltage clusters.

In one embodiment, the programmable unit is configured to apply a new set of the switch positions substantially in real-time on a time-slot basis.

In another embodiment, the at least one programmable unit includes a microcontroller disposed on the integrated circuit.

In yet another embodiment, the one or more power routers of the plurality of power routers is a complex power delivery system including one or more sensors, one or more dynamically adaptable power supplies, one or more switches and a microcontroller configured to control the one or more dynamically adaptable power supplies and the one or more switches in response to measurements based on the one or more sensors.

According to another aspect, a heterogeneous power distribution system for an integrated circuit includes a power network-on-chip (PNoC) is configured to receive electrical power from one or more off-chip power converters. The power network-on-chip includes a mesh of power routers that are electrically coupled to and configured to power a plurality of on-chip loads. The mesh of power routers includes a plurality of integrated simple power routers and a plurality of integrated complex power routers. Each complex power router of the plurality of complex power routers includes a microcontroller and is communicatively coupled to one or more switches and one or more sensors of the complex power router. The microcontroller is configured to run a process algorithm that dynamically routes and controls power according to a power delivery policy by controlling the one or more switches based on information received from the one or more sensors.

In one embodiment, each power domain of a plurality of power domains is controlled by a power router of the mesh of power routers.

In another embodiment, one or more of the plurality of integrated simple power routers include a linear voltage regulator.

In yet another embodiment, at least one complex power router controls a plurality of linear low dropout regulators within a common power domain.

In yet another embodiment, the power network-on-chip receives a converted electrical power from a plurality of off-chip switching power converters and delivers a regulated electrical power to a plurality of on-chip voltage clusters.

In yet another embodiment, the power network-on-chip includes one or more real-time dynamic voltage scaling circuits.

In yet another embodiment, the power network-on-chip includes one or more real-time dynamic frequency scaling circuits.

In yet another embodiment, the power network-on-chip includes one or more real-time adaptable energy allocation circuits.

In yet another embodiment, the power network-on-chip includes one or more adaptive RC compensation networks.

In yet another embodiment, the RC compensation network is includes a capacitive block electrically coupled to two series resistive blocks, the capacitive block and the two series resistive blocks are digitally controlled and digitally configured to stabilize a linear regulator under a wide range of process variations.

In yet another embodiment, the power network-on-chip includes one or more adaptive current boost networks.

In yet another embodiment, at least one of the one or more adaptive current boost networks is electrically coupled to and controls a current through a differential pair of a linear regulator. When a high slew rate transition at an output of the linear regulator occurs, a boost mode is activated, raising a tail current of the differential pair, or alternatively, during a regular mode causing substantially no additional current flows into the differential pair, enhancing a power efficiency of the linear regulator.

In yet another embodiment, the power network-on-chip controls an on-chip quality of power factor.

According to yet another aspect, a method to determine a near optimal distribution of power supply resources in a heterogeneous power delivery system includes the steps of: providing an electronic system programmed to distribute power supply resources in the heterogeneous power delivery system; accepting by computer process a set of voltage domain information including a number N of on-chip voltage domains and a voltage V and current load I for each of the on-chip voltage domains and a maximum number $N_{S,MAX}$ of off-chip switching mode power supplies; calculating by a computer process that is more computationally efficient than an exhaustive optimal computation by use of at least a selected one of: a binary power supply clustering process and a linear power supply clustering process, based on the set of voltage domain information and the maximum number $N_{S,MAX}$ of off-chip switching mode power supplies, a near optimal set of voltage clusters including a number and distribution of linear low dropout regulators associated with each cluster, the linear low dropout regulators configured to power each of the on-chip voltage domains; and configuring the electronic system to the near optimal distribution of power supply resources based on the near optimal set of voltage clusters.

In another embodiment, the method further includes at each step of the binary power supply clustering process a step of identifying a specific voltage cluster having a widest voltage range and distributing one or more of the linear low dropout regulators into two separate clusters.

In yet another embodiment, the linear power supply clustering process linearly distributes a plurality of linear low dropout regulators within the voltage clusters.

The foregoing and other objects, aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles of the application. In the drawings, like numerals are used to indicate like parts throughout the various views.

DETAILED DESCRIPTION

In the description, other than the bolded paragraph numbers, non-bolded square brackets ("[ ]") refer to the citations listed hereinbelow.

The method for heterogeneous method for energy efficient distribution of on-chip power supplies is first described in five parts, followed by a power network on-chip system for scalable power delivery, also in five parts.

HETEROGENEOUS METHOD FOR ENERGY EFFICIENT DISTRIBUTION OF ON-CHIP POWER SUPPLIES

Part I Introduction

The delivery of high quality power to on-chip circuitry with minimum energy loss is a fundamental requirement of all integrated circuits (ICs). To supply sufficient power, a higher unregulated DC voltage is usually stepped down and regulated within the power delivery system [1]. Power conversion and regulation resources should be efficiently managed to supply high quality power with minimum energy losses within multiple on-chip voltage domains [2].

The design complexity of a power delivery system increases with greater requirements on the quality of the power supply, limitations of the passive elements, board and package parasitic impedances, and limited number of I/O pins. In a modern system-on-chip (SoC), the power supplies provide voltages for the ICs within the overall system (CPUs, GPUs, hard disks, storage, sensors, and others), as well as the analog and digital circuit blocks within the ICs. A regulated 12 volt output voltage is often derived off-chip from a 48 volt battery voltage [1]. The on-chip DC voltage levels are significantly lower and range from a fraction of a volt in low power digital blocks to several volts in input/output buffers, high precision analog blocks, and storage ICs. Furthermore, to effectively exploit the power-delay tradeoff, additional power management techniques such as dynamic voltage scaling (DVS) and dynamic voltage and frequency scaling (DVFS) are employed, further increasing the design complexity of the power delivery system. Thus, to efficiently manage the power delivered to a modern SoC, what is needed is a methodology to distribute and manage the power supplies. A method that provides rules for heterogeneous power delivery and performance evaluation of an overall power delivery system is described in detail hereinbelow.

Figure 1:
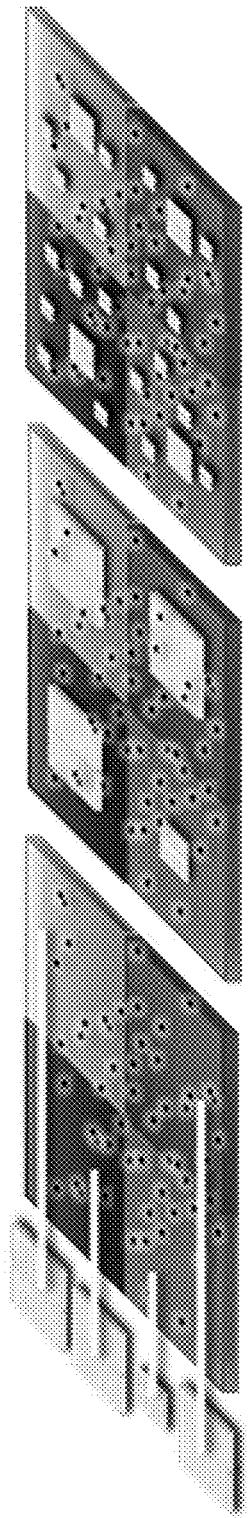
FIG. 1A shows an illustration of a power delivery system with four off-chip voltage domains.
FIG. 1B shows an illustration of a power delivery system with four integrated on-chip voltage domains.
FIG. 1C shows an illustration of a power delivery system with distributed point-of-load power supplies for voltage conversion and regulation.

Traditionally, power is managed off-chip with energy efficient power converters (FIG. 1A), delivering high quality DC voltage and current to the electrical grid that reliably distributes the on-chip power. The supply voltage, current density, and parasitic impedance, however, scale aggressively with each technology generation, degrading the quality of the power delivered from the off-chip power supplies to the on-chip load circuitry. The power supply in a package (PSiP) approach with partially off-chip yet in package power supplies has recently been considered as an intermediate power supply technology with respect to cost, complexity, and performance [3]. The power is regulated on-chip to lower the parasitic impedance of both the board and package (FIG. 1B). To fully integrate a power converter on-chip, advanced passive components, packaging technologies, and circuit topologies are important. Recently, several power converters suitable for on-chip integration have been fabricated [4]-[24]. Based on these power converters, a power supply system with several on-chip power converters can be developed to improve the quality of the power delivered within the ICs.

On-chip power supply integration is an important cornerstone to the power supply design process. A single on-chip power converter is however not capable of supplying sufficient, high quality regulated current to the billions of current loads within the tens of on-chip voltage domains. To maintain a high quality power supply despite increasing on-chip parasitic impedances, hundreds of ultra-small power converters should ultimately be integrated on-chip, close to the loads within the individual multiple voltage domains [4]-[7]. A distributed point-of-load (POL) power supply system is illustrated in FIG. 1C.

While the quality of the power supply can be efficiently addressed with a distributed multi-voltage domain system, the limited power efficiency of the on-chip converters is a primary concern for the POL approach. The high power efficiency of the off-chip power converters is traded off for small area and locally regulated current and voltage. To address the concerns of a POL power supply system, existing power converter topologies are described and compared in Part II. Heterogeneous power delivery is introduced in Part III to both decrease the noise and increase the efficiency of the supplied power. Electronic systems are defined as including systems that combine electronic circuits and components, and systems which are designed to realize complex functions (e.g., including computer and telecommunication systems). Process algorithms to determine how best to distribute the power supplies within a heterogeneous power delivery system of an electronic system and related simulation results are presented, respectively, in Part IV and Part V. The new method is summarized in Part VI.

Part II Power Converter Topologies

Switching and linear DC-DC converters are the most commonly used topologies for DC-DC conversion and regulation. Historically, a large switching mode power supply (SMPS) is preferred over a compact linear power supply due to the high, ideally 100%, power efficiency of an SMPS. With on-chip power converters, strict area constraints are imposed on the DC-DC converters, affecting the choice of power supply topology. Compact switching power converters can potentially be designed at higher switching frequencies. The parasitic impedance in these converters however increases, degrading the power efficiency of the power delivery system. The physical size and power efficiency of switching and linear topologies are discussed, respectively, in Part II.A and Part II.B. Some conclusions reviewing a preferable choice of on-chip power supply topology are provided in Part II.C.

A. Switching Converters

Figure 2:
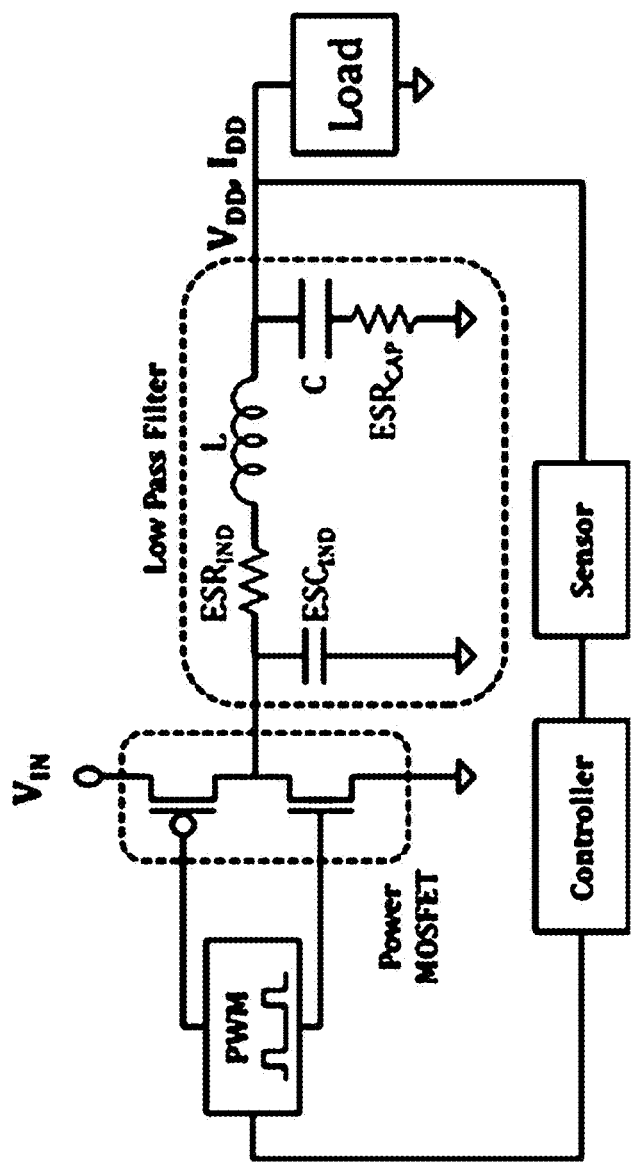
FIG. 2 shows a schematic diagram of an exemplary buck converter.

A typical switching mode power supply converts an input voltage $V_{IN}$ to an output voltage $V_{DD}$, supplying the required current $I_{DD}$ to the load circuitry. These converters are operated by a switching signal fed into passive energy storage components through a power MOSFET controlled by a pulse width modulator (PWM). A common step down SMPS converter operating as a buck converter is shown in FIG. 2. The stored input energy is restored at the output at a voltage level, maintaining high power efficiency up to a frequency $f_s$ of a few megahertz [25]. The operational mode of a buck converter, output voltage, output current, and transient performance are affected by the output LC filter and controller in the feedback loop, as illustrated in FIG. 2. The on-chip integration of SMPS converters is greatly complicated due to I/O limitations, and constraints related to the physical size of the passive elements [26]. The area required by the passive components to achieve a specific impedance is inversely proportional to the frequency, and can be reduced in on-chip converters by operating at ultra-high switching frequencies. Conversely, an SMPS operating at a high frequency is more greatly affected by the parasitic impedances, degrading the power efficiency of the converter.

The area of a buck converter is dominated by the size of the passive elements and is $$A_{Buck} \approx \frac{L}{L_\square} + \frac{C}{C_\square}, \quad (1)$$

where $L_\square$ and $C_\square$ are, respectively, the inductance and capacitance per square micrometer of the LC filter. The voltage regulation is a primary concern for POL power delivery. In Discontinuous Conduction Mode (DCM) [5], the current ripple $\gamma_i I_{DD}$ within the inductor L exceeds the output current $I_{DD}$, and the voltage $V_{DD}$ at the output of a converter becomes load dependent, degrading the quality of the delivered power. To support high load regulation, the buck converter is assumed in this analysis to be loaded with an output current $I_{DD}$ that exceeds the current ripple ($\gamma_i I_{DD} \leq I_{DD}$), yielding expressions for the inductor and capacitor operating in the Continuous Conduction Mode (CCM) [5], $$L = \frac{V_{IN} - V_{DD}}{2 f_s \gamma_i I_{DD}} \cdot \frac{V_{DD}}{V_{IN}}, \quad (2)$$

$$C = \frac{\gamma_i L_{DD}}{8 f_s \gamma_v V_{DD}}, \quad (3)$$

where $\gamma_v V_{DD}$ is the voltage ripple at the converter output, and $V_{DD}$ is the voltage at the load. To satisfy the tight load regulation specifications, the output voltage ripple is assumed to range up to 10% of $V_{DD}$ ($\gamma_v = 0.1$). Substituting (2) and (3) into (1), the area of a buck converter is $$A_{Buck} = \left(\frac{(V_{IN} - V_{DD})V_{DD}}{2LV_{IN}f_s}\right)\frac{1}{\gamma_i I_{DD}} + \left(\frac{1}{8C\gamma_v V_{DD}f_s}\right)\gamma_i I_{DD}. \quad (4)$$

At low values of current ripple, the area of a buck converter is dominated by the inductor and increases with smaller values of $\gamma_i I_{DD}$. Alternatively, at larger values of $\gamma_i I_{DD}$, the area of a buck converter is dominated by the capacitor size and is proportional to the current ripple. An optimum ripple current $\gamma_{i,OPT} I_{DD}$ therefore exists that minimizes the area of a buck converter for a target output voltage ripple $\gamma_v V_{DD}$, and input and output voltage levels, $$\gamma_{i,OPT} I_{DD} = \begin{cases} 2\sqrt{\gamma_v\left(1 - \frac{V_{DD}}{V_{IN}}\right)\frac{C}{L}} \cdot V_{DD}\gamma_G \cdot V_{DD} & \gamma_G \cdot V_{DD} \leq I_{DD} \quad (5) \\ I_{DD}, & \gamma_G \cdot V_{DD} > I_{DD} \quad (6) \end{cases}$$

where $\gamma_G G$ is the output conductance ripple and depends upon the technology parameters, converted voltages, and regulation specification. The minimum area of the buck converter is therefore $$A_{Buck,MIN} \approx \frac{1}{2f_s} \begin{cases} \sqrt{\frac{1}{\gamma_v}\left(1 - \frac{V_{DD}}{V_{IN}}\right)\frac{1}{LC}}, & \gamma_G \cdot V_{DD} \leq I_{DD} \quad (7) \\ \left[\left(1 - \frac{V_{DD}}{V_{IN}}\right)\frac{1}{L} \cdot \frac{V_{DD}}{I_{DD}} + \left(\frac{1}{4\gamma_v}\right)\frac{1}{C} \cdot \frac{I_{DD}}{V_{DD}}\right] \approx \left(1 - \frac{V_{DD}}{V_{IN}}\right)\frac{V_{DD}}{LI_{DD}}, & \gamma_G \cdot V_{DD} > I_{DD} \quad (8) \end{cases}$$

Thus, in CCM at low current loads ($I_{DD} < \gamma_G G \cdot V_{DD}$), the minimum area of a buck converter is dominated by the inductance characteristics and increases with smaller values of $I_{DD}$. However, for values of $I_{DD}$ larger than $\gamma_G G \cdot V_{DD}$, the minimum size of a buck converter does not strongly depend on $I_{DD}$. Alternatively, both the power MOSFET losses and power dissipated in the LC filter are dominant at different frequencies, conversion voltages, and current levels in CCM. The power dissipated in the power MOSFET comprises the MOSFET switching power ($\propto f_s V_{IN}^2$), and the resistive power ($\propto R_{ON} I_{DD}^2$) dissipated by the effective resistor $R_{ON}$ of the MOSFET, yielding $$P_{Buck,MOS} = \frac{l_{min}^2}{\mu R_{ON}(V_{IN}-V_T)} \cdot f_s V_{IN}^2 + \frac{4}{3} R_{ON} \frac{V_{DD}}{V_{IN}} I_{DD}^2, \quad (9)$$

where $l_{min}$ is the minimum channel length, is the MOSFET carrier mobility, and $V_T$ is the threshold voltage [27].

From (9), increasing the effective resistance of the MOSFET reduces the switching power dissipation, while increasing the resistive loss. Thus, an optimum MOSFET resistance $R_{ON}^{OPT}$ exists that minimizes the power dissipated in an MOSFET, yielding $$R_{ON}^{OPT} = \sqrt{\frac{3}{4} \frac{l_{min}^2}{\mu(V_{IN}-V_T)} \cdot f_s \frac{V_{IN}}{V_{DD}}} \cdot \frac{V_{IN}}{I_{DD}}, \text{ and} \quad (10)$$

$$P_{Buck,MOS}^{MIN} = 2 I_{DD} \sqrt{\frac{4}{3} \frac{l_{min}^2}{\mu(V_{IN}-V_T)} \cdot f_s V_{IN} V_{DD}}. \quad (11)$$

The power dissipated in an LC filter [27] comprises the power losses due to the resistive ($ESR_{IND}$) and capacitive ($ESC_{IND}$) parasitic impedances of the inductor, $$P_{Buck,IND} = 4/3 ESR_{IND} \cdot I_{DD}^2 + ESC_{IND} f_s \cdot V_{IN}^2, \quad (12)$$

and the power losses due to the parasitic resistance of the capacitor ($ESR_{CAP}$), $$P_{Buck,CAP} = ESR_{CAP}(\gamma_I I_{DD})^2. \quad (13)$$

The total power dissipation and power efficiency of the buck converter are, respectively, $$P_{Buck} = \left(\frac{4}{3} ESR_{IND} + ESR_{CAP}\right) \cdot I_{DD}^2 + \quad (14)$$
$$2\sqrt{\frac{4}{3} \frac{l_{min}^2}{\mu(V_{IN}-V_T)} \cdot f_s V_{IN} V_{DD}} \cdot I_{DD} + ESC_{IND} \cdot f_s \cdot V_{IN}^2,$$

$$\eta_{Buck} = \frac{P_{Load}}{P_{Load}+P_{Buck}} = \quad (15)$$
$$\frac{I_{DD} V_{DD}}{\left(\frac{4}{3} ESR_{IND} + ESR_{CAP}\right) \cdot I_{DD}^2 +}$$
$$\left[V_{DD} + 2\sqrt{\frac{4}{3} \frac{l_{min}^2}{\mu(V_{IN}-V_T)} \cdot f_s V_{IN} V_{DD}}\right] \cdot I_{DD} + ESC_{IND} \cdot f_s \cdot V_{IN}^2$$

Figure 3A:
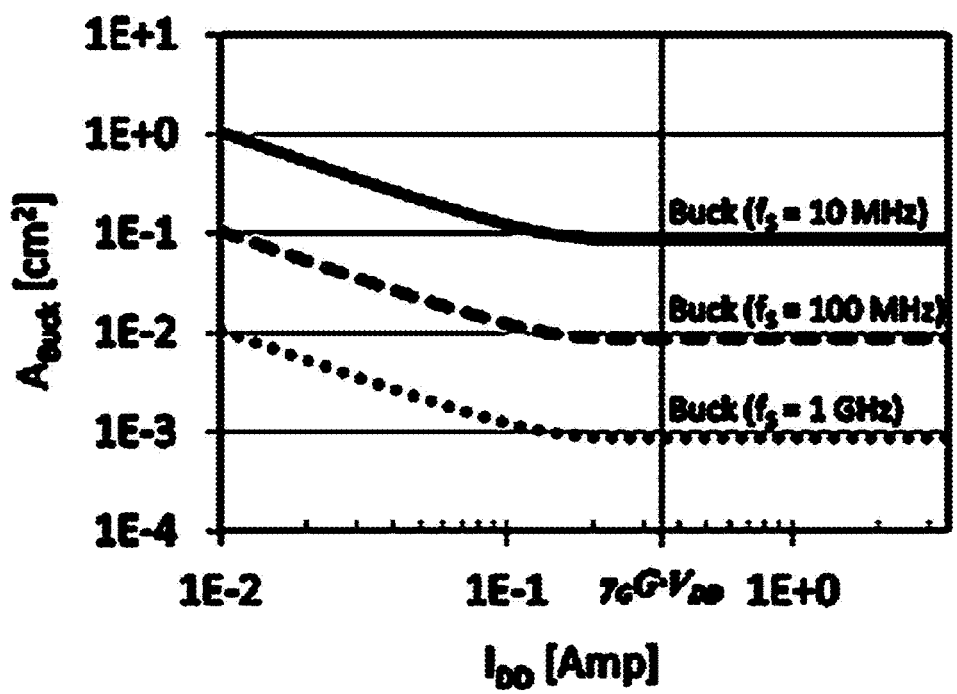
FIG. 3A shows a graph of physical area vs. load current for moderate, high, and ultra-high switching frequencies.
Figure 3B:
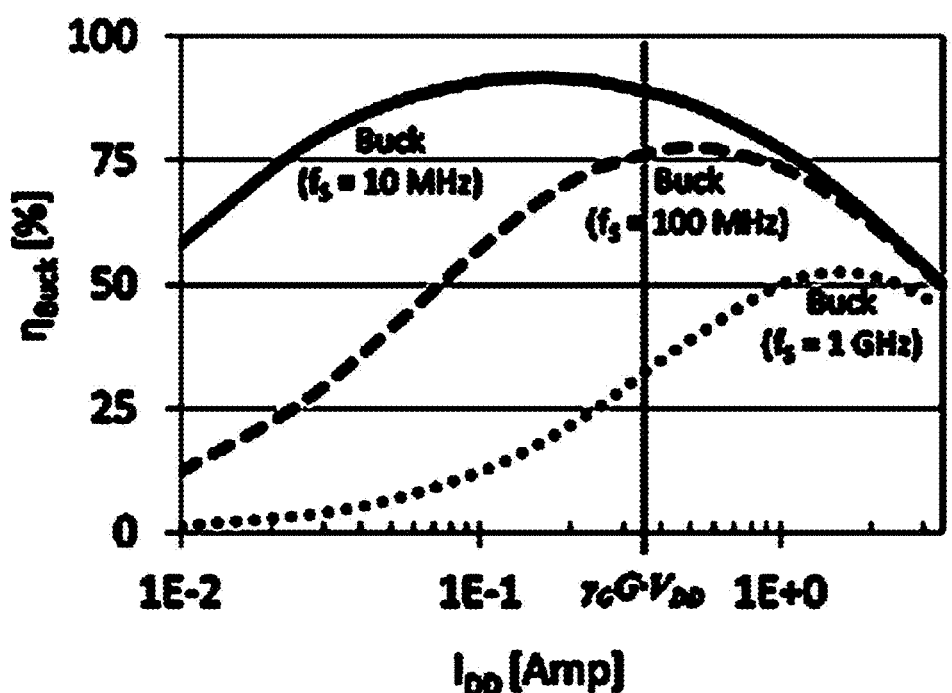
FIG. 3B shows a graph of power efficiency vs. load current for moderate, high, and ultra-high switching frequencies.

Typical passive component parameters, represented by [28]-[30] and technology parameters [31], are assumed to demonstrate power and area tradeoffs and trends in buck converters. Current load levels from a few milliamperes to several amperes, and input and output voltages of, respectively, 1 volt and 0.7 volts, are considered. The physical area (see (7)) and power efficiency (see (15)) trends are depicted in FIG. 3A and FIG. 3B for moderate (10 MHz), high (100 MHz), and ultra-high (1 GHz) switching frequencies. At low current loads, the power losses of a buck converter in CCM are dominated by the parasitic capacitance of the inductor ($ESC_{IND}$), decreasing the power efficiency at lower $I_{DD}$ and larger converter size ($A_{Buck} \propto 1/I_{DD}$ for $I_{DD} < \gamma_G G \cdot V_{DD}$). Alternatively, at high current loads, the power efficiency is dominated by the parasitic resistance of the inductor ($ESR_{IND}$) and capacitor ($ESR_{CAP}$), increasing the power losses of a buck converter at higher values of $I_{DD}$. Thus, a buck converter exhibits a parabolic shaped power efficiency with current in CCM, while the physical size of the converter is reduced at higher currents. Therefore, by targeting high switching frequencies, the preferred current load can be determined to convert a voltage with minimum power losses and area for a specific value of switching frequency $f_s$. For example, as shown in FIG. 3A and FIG. 3B, a preferable current exists for $f_s = 100$ MHz and $f_s = 1$ GHz since the maximum power efficiency is reached at $I_{DD} > \gamma_G G \cdot V_{DD}$, but not at $f_s = 10$ MHz. The minimum power loss in (15) is proportional to $\sqrt{f_s}$, significantly degrading the power efficiency at high frequencies. Alternatively, the size of the power supply converter is proportional to $1/f_s$, and decreases at higher frequencies, exhibiting an undesirable tradeoff between the power efficiency and physical size of a buck converter.

The high power efficiency of traditional large power converters operating at low frequencies is therefore traded off for smaller physical size at ultra-high switching frequencies.

B. Linear Converters

Figure 4:
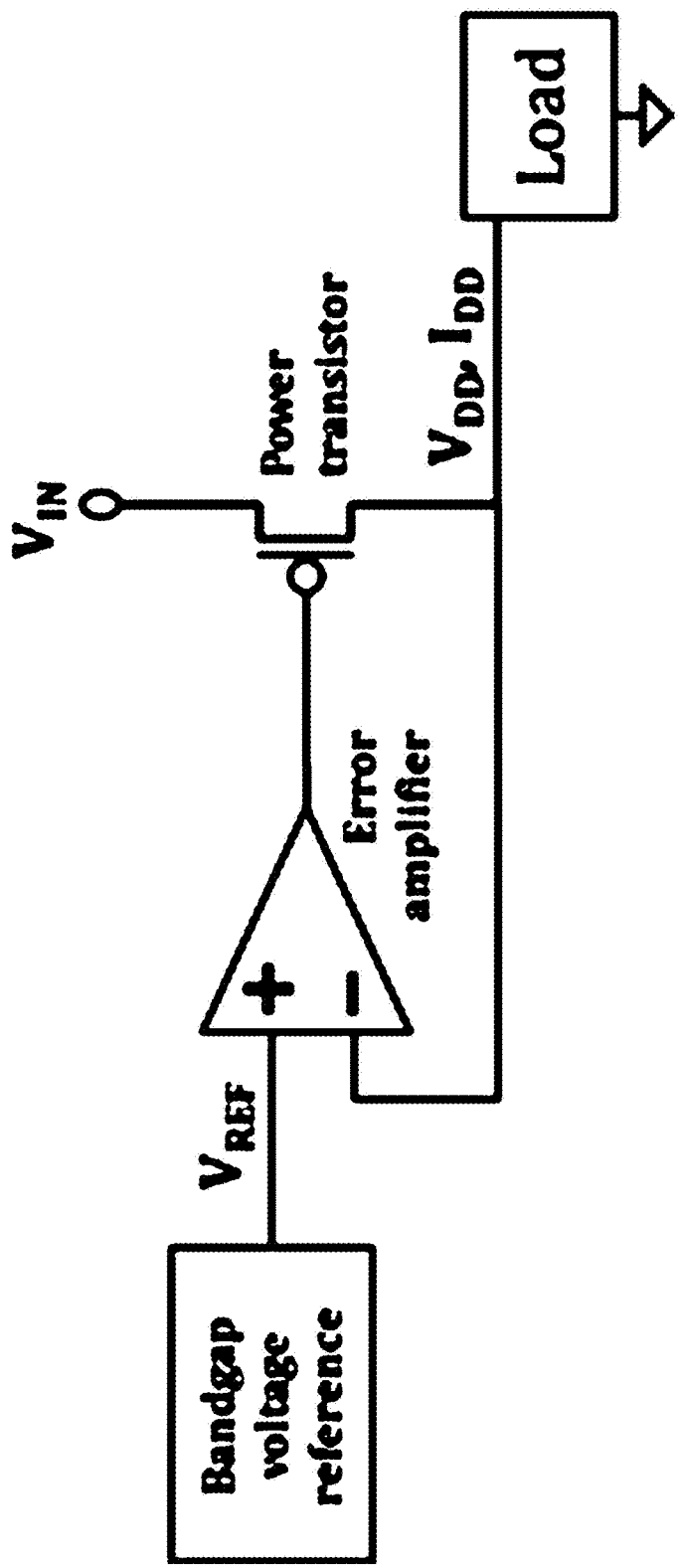
FIG. 4 shows a schematic diagram of an exemplary linear low dropout regulator (LDO) circuit.

To supply a specific voltage $V_{DD}$ and current $I_{DD}$ to the load circuitry, a linear power supply converts an input DC voltage $V_{IN}$ using a resistive voltage divider controlled by feedback from the output. The primary drawback of a linear topology is the resistive power losses that increase with a larger $V_{IN}$-$V_{DD}$ voltage drop, which limit the power efficiency to $V_{DD}/V_{IN}$. Alternatively, linear converters exhibit a relatively small area, an important characteristic for on-chip integration. FIG. 4 shows a schematic diagram of an exemplary standard linear converter, a low dropout (LDO) DC-DC regulator that operates with a low $V_{IN} V_{DD}$ voltage drop.

Figure 5:
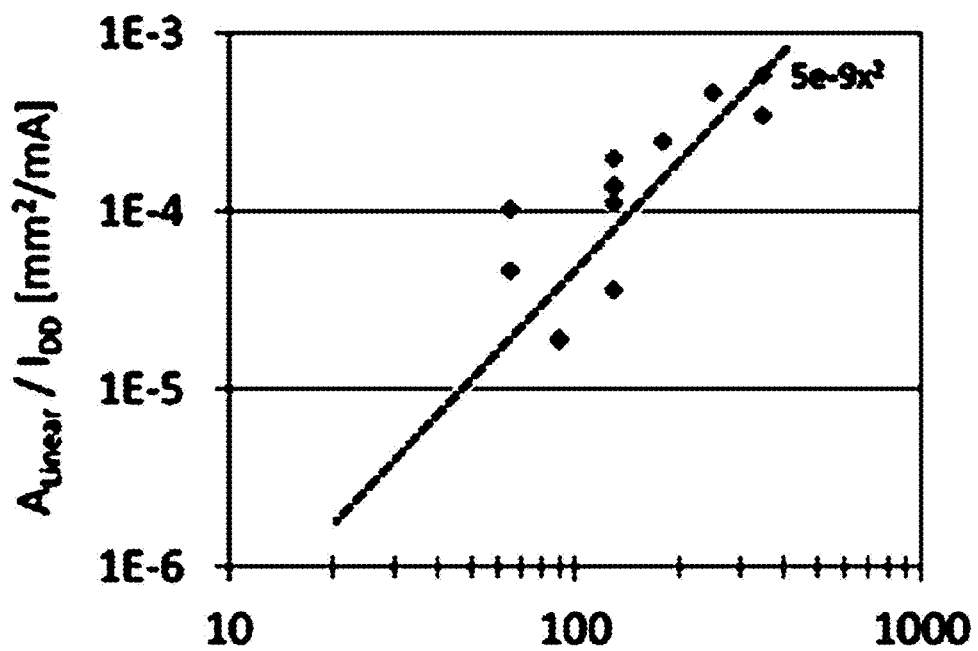
FIG. 5 shows a graph of LDO physical area per 1 mA load vs. technology length.

The total current supplied by a linear converter comprises the useful LDO current $I_{DD}$ that flows to the load, and the short-circuit current dissipated in the bandgap voltage reference and error amplifier. Power and area efficient voltage references have been reported [11]-[14]. The total LDO current is, therefore, dominated by the error amplifier and power transistor currents. To mitigate transient voltage peaks while supporting fast changes in the load current, larger currents should be utilized within the error amplifier, increasing the short-circuit current. Alternatively, to satisfy the current load requirements in modern high performance circuits, high currents of up to several amperes are used by the load circuitry. The current flow within an LDO is therefore dominated by the load current $I_{DD}$. In this case, both the area and power dissipation of a linear converter are primarily dictated by the size of the output power transistor and the dissipated power. Thus, the area of an LDO is proportional to the width W of the output transistor, yielding $$A_{Linear} \propto \alpha \cdot W l_{min} = \alpha \cdot \frac{I_{DD} \cdot l_{min}^2}{\mu C_{OX}(V_{IN}-V_T)^2}, \quad (16)$$

where α is the transistor area-to-W·$l_{min}$ ratio, $l_{min}$ is the minimum channel length, μ is the MOSFET carrier mobility, and $C_{OX}$ is the gate oxide capacitance. To accommodate the effect of the line and load specifications that may significantly affect the physical size of an LDO, a typical area per 1 mA load [4]-[14] (FIG. 5) is considered for those LDOs with a high current load, exhibiting a parabolic trend of area with minimum technology length ($A_{Linear}/I_{DD} \propto l_{min}^2$).

Figure 6:
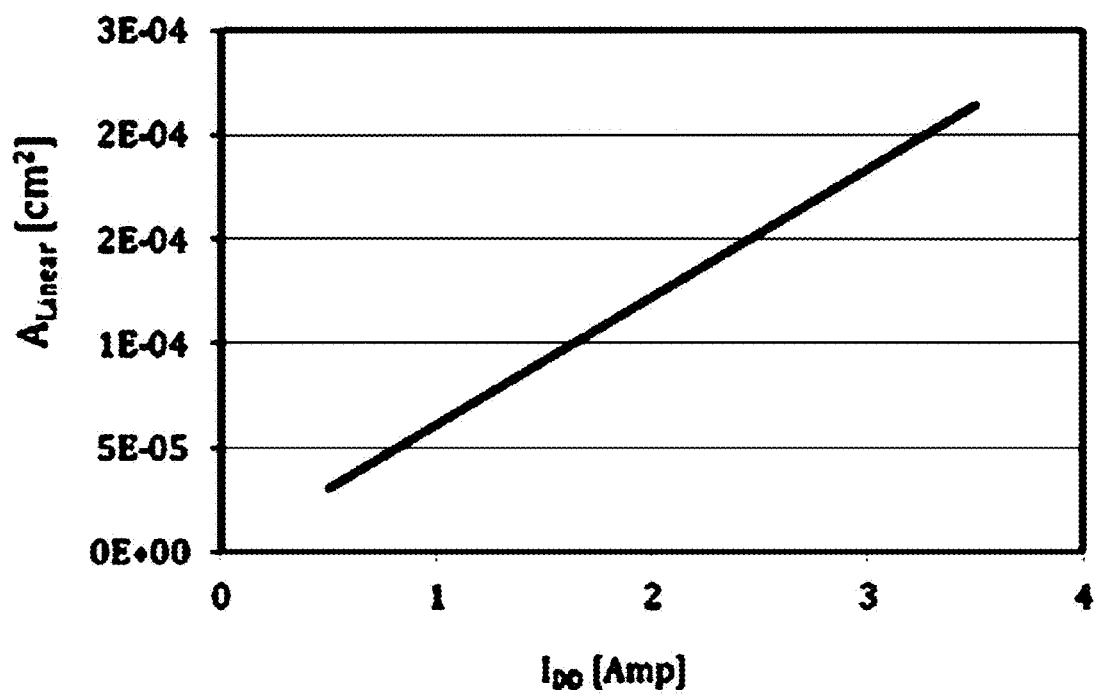
FIG. 6 shows a graph of LDO area for typical current loads.

The ratio $A_{Linear}/I_{DD} = 5 \cdot 10^{-6}$ mm$^2$/mA corresponds to the 28 nm technology node considered in FIG. 6. Typical 28 nm CMOS technology parameters [31], and input and load voltages are assumed in this analysis to demonstrate the need for a large power transistor to supply high current to the load (FIG. 6). The size of the linear converter ranges from 60×60 μm$^2$ for $I_{DD}$=0.5 amperes to 150×150 μm$^2$ for $I_{DD}$=3.5 amperes (FIG. 6), which can be further reduced with technology scaling ($A_{Linear} \propto l_{min}^2$) and advanced design solutions [4]-[24]. The current can therefore be supplied to the load with an LDO that is orders of magnitude smaller than a corresponding buck converter.

The power dissipation of an LDO is $$P_{Linear} \approx (V_{IN} - V_{DD})I_{DD} \qquad (17)$$

Figure 7A:
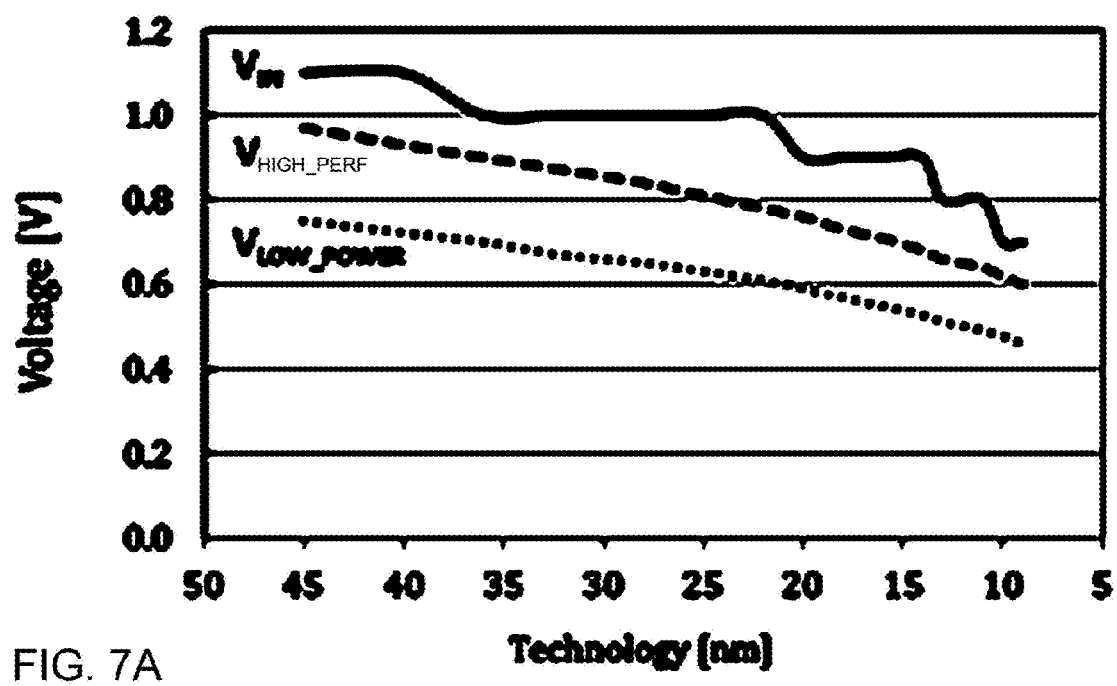
FIG. 7A shows a graph of voltage vs. technology length illustrating trends in typical high performance, low power, and internal core primary voltage supplies.
Figure 7B:
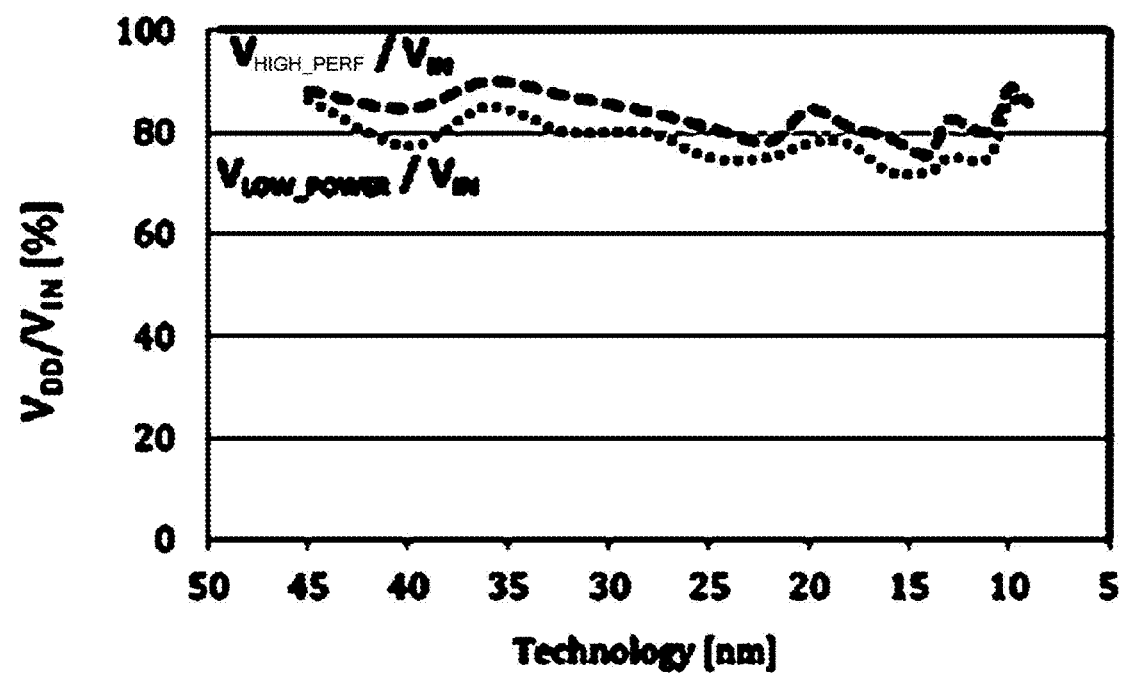
FIG. 7B shows a graph of $V_{DD}/V_{IN}$ % vs. technology length illustrating trends in internal voltage conversion ratios.

Thus, the power loss in a linear converter increases with a higher $V_{IN}$–$V_{DD}$ drop, degrading the power efficiency of the converter. Recent supply voltage trends are illustrated in FIG. 7A and FIG. 7B for the internal core primary voltage $V_{IN}$, and typical high and low $V_{DD}$ levels [31], yielding efficiency bounds within the 70% to 90% range of the $V_{DD}/V_{IN}$ ratio shown in FIG. 7A and FIG. 7B. Thus, a moderate LDO power efficiency $\eta_{Linear} = V_{DD}/V_{IN}$ of at least 70% can be predicted.

Sub/near threshold computing is a promising technique to reduce the power consumed by an IC [32], [33]. To provide a stable supply voltage at sub/near threshold levels, tunable low noise voltage regulation below 0.5 volts is required. A conventional analog LDO, however, fails to operate at these low voltages. A digital LDO can be used to suppress the analog nature of a conventional LDO [34], [35].

C. Comparison of Power Supply Topologies

Figure 8A:
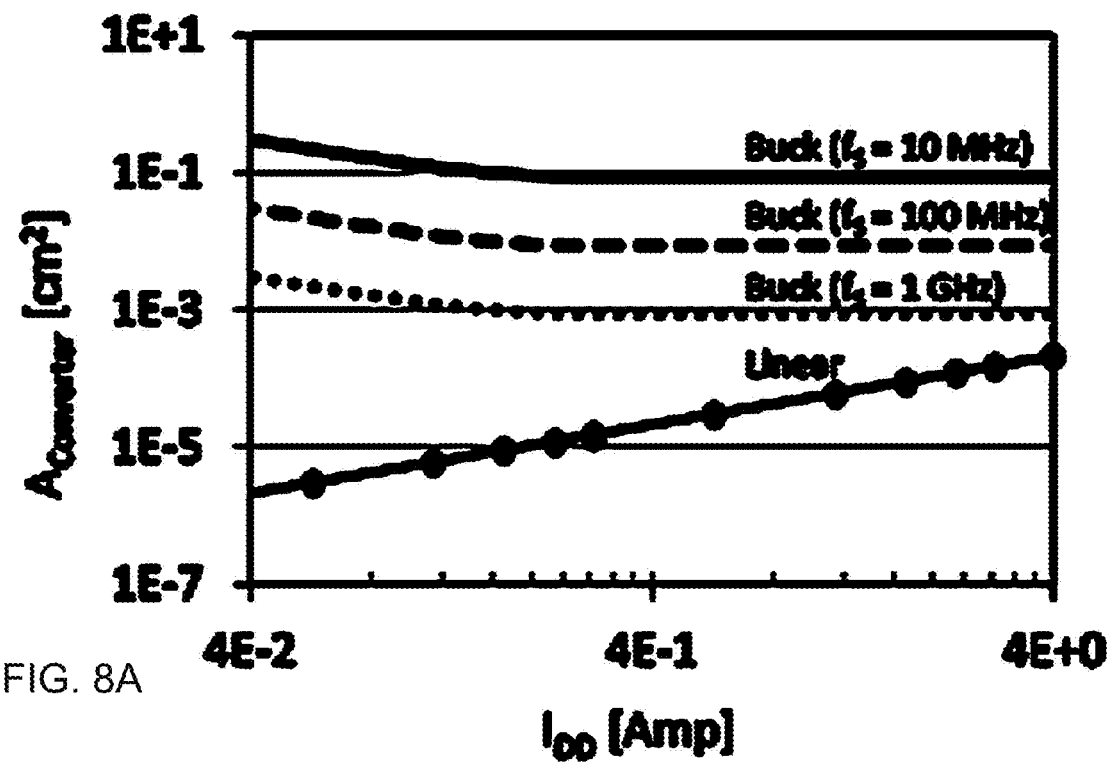
FIG. 8A shows a graph of LDO and buck converter physical area vs. current for moderate, high, and ultra-high switching frequencies.
Figure 8B:
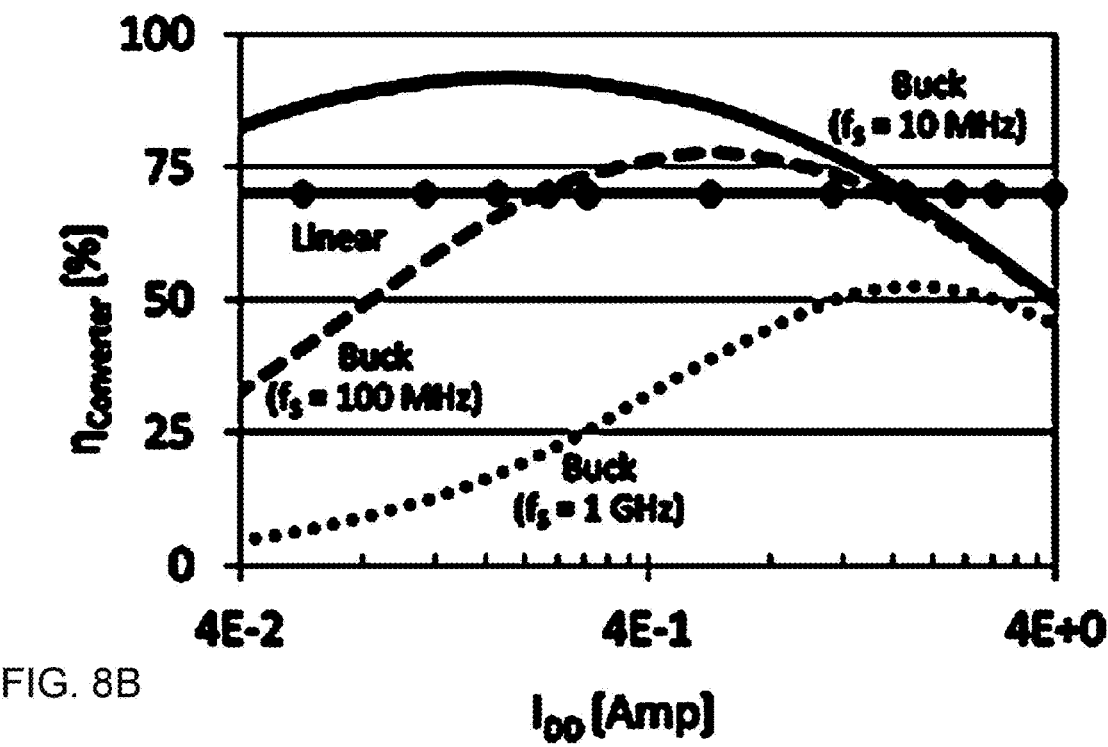
FIG. 8B shows a graph of LDO and buck converter power efficiency vs. current for moderate, high, and ultra-high switching frequencies.

The physical area and power efficiency of an LDO and buck converter is shown in FIG. 8A and FIG. 8B. Buck converters that are more power efficient than an alternative LDO can operate at lower switching frequencies. These buck converters are, however, inappropriate for on-chip power conversion due to the large physical size and technology constraints of the passive elements that make on-chip integration even more difficult. Alternatively, compact buck converters can operate at high switching frequencies. These buck converters, however, exhibit a lower power efficiency and are therefore less effective for on-chip integration. Thus, to deliver high quality power to the load circuitry under typical area constraints, on-chip linear regulators should be considered. The moderate power efficiency of an LDO becomes a significant constraint when the power consumption at the load increases. For example, converting 2 volts into 1 volt while delivering 1 μAmp to the current load results in a 50% power efficiency and 1 μWatt power loss that can possibly be absorbed by the power delivery system. Alternatively, converting 1.25 volts into 1 volt while delivering 1 mA to the current load results in 80% power efficiency and a significant 250 μWatt power loss that is difficult to mitigate. Thus, linear regulators are preferable to switching power supplies, mainly for small input-output voltage differences. A heterogeneous power delivery system that efficiently exploits the power and area characteristics of linear and switching converters is desirable to enhance the power supply quality and efficiency while satisfying on-chip area constraints.

Part III Heterogeneous Power Delivery System

Figure 9:
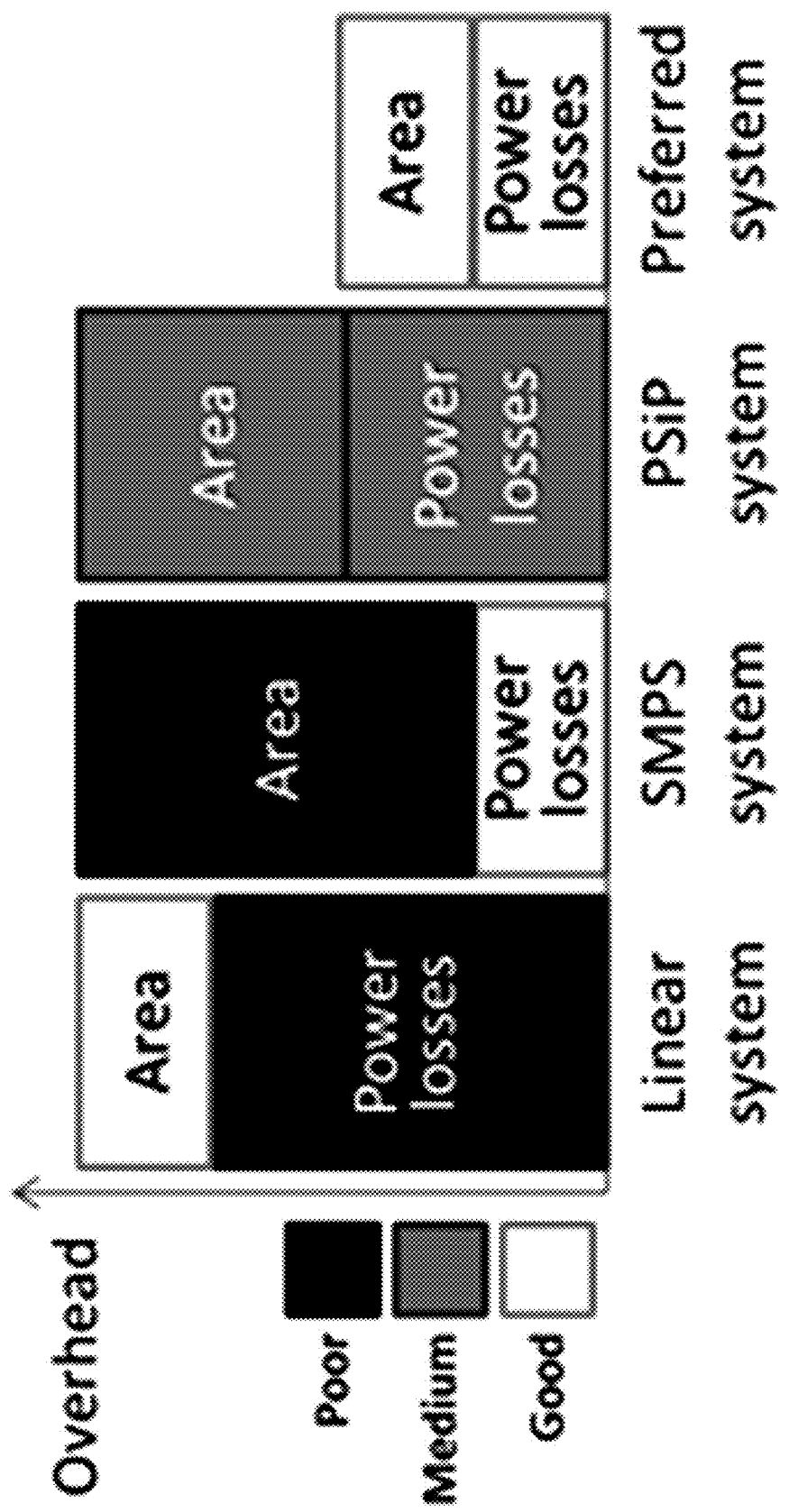
FIG. 9 shows a chart of Power and area overhead of a linear, switching mode power supplies (SMPS), power supply in a package (PSiP), and preferred power conversion system.

Both linear and switching power regulators are characterized by an undesirable power-area tradeoff, exhibiting either high power in compact linear regulators or large area in power efficient SMPS, as depicted in FIG. 9. Thus, the overhead of a power delivery system composed of only switching or linear regulators is significant. Several power delivery solutions exist that exhibit intermediate power losses and area as compared to either linear or traditional SMPS systems. For example, in a PSiP system, lower power losses as compared to a linear system, and smaller area as compared to a traditional off-chip SMPS system, are traded off for greater design complexity. A desirable power delivery system minimizes power losses while satisfying on-chip area constraints, yielding both high power efficiency and small area, as depicted in FIG. 9.

Figures 10A, 10B, 10C:
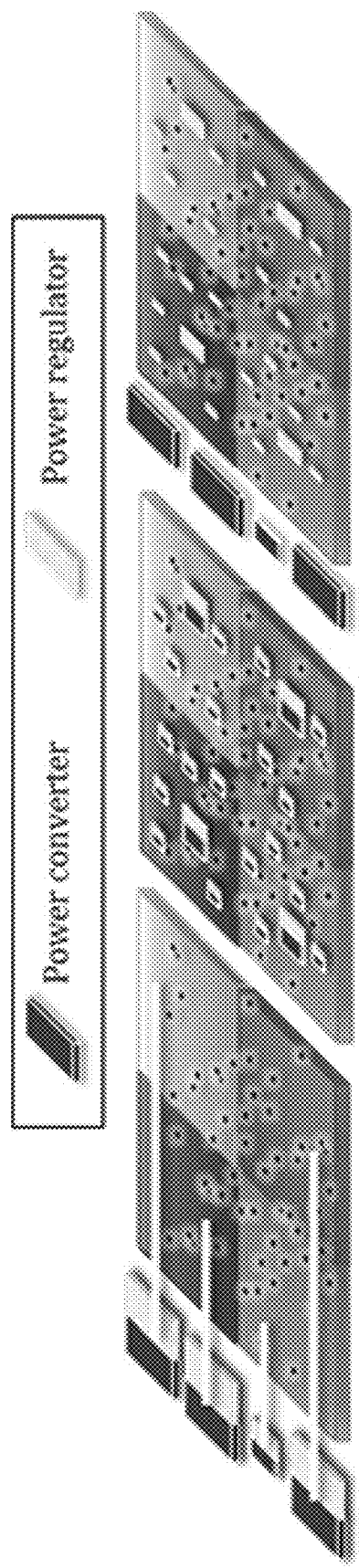
FIG. 10A shows an illustration of a power delivery system with four voltage domains, utilizing off-chip power supplies.
FIG. 10B shows an illustration of a power delivery system with four voltage domains, utilizing distributed point of load (POL) power supplies.
FIG. 10C shows an illustration of a power delivery system with four voltage domains, utilizing a heterogeneous system with off-chip converters and on-chip regulators.

To exploit the advantages of switching and linear converters, a heterogeneous power delivery system is described hereinbelow that converts the power in off-chip switching power supplies and regulates the on-chip power with compact linear power supplies, minimizing LDO voltage drops and on-chip power losses. In a heterogeneous power delivery system, the area overhead is primarily constrained by the compact LDOs that regulate the on-chip power, while the power overhead is dictated by the power efficient switching converters. Power conversion is therefore decoupled from power regulation, lowering the power and area overhead of the overall power delivery system. A heterogeneous power delivery system moderates the drawbacks and exploits the advantages of the historically power efficient power supplies that both convert and regulate the power off-chip with more recent trends for area efficient distributed power supplies that both convert and regulate the power on-chip. Off-chip, on-chip distributed, and heterogeneous power delivery topologies are illustrated in FIG. 10A, FIG. 10B and FIG. 10C.

Consider a heterogeneous power delivery system with $N_L$ on-chip LDOs and $N_S$ off-chip SMPSs that deliver power to N voltage domains $\{(V_{DD}^{(i)}, I_{DD}^{(i)})\}_{i=1}^N$ with an operating voltage $V_{DD}^{(i)}$ and current $I_{DD}^{(i)}$. To supply voltages, $V_{DD}^{(i)} \ne V_{DD}^{(j)} \forall i \ne j$, the number of on-chip power supplies $N_L$ should be equal to or greater than the number of voltage domains $N \le N_L$. Alternatively, each SMPS drives one or more LDOs, yielding the relation, $N_S \le N_L$. The effect of the number of on-chip power regulators and off-chip power converters, and the distribution of the on-chip power supplies in a heterogeneous power delivery system is described, respectively, in Part III.A, Part III.B, and Part III.C.

A. Number of On-Chip Power Regulators

The area of an LDO is proportional to the current load (see equation 16), and the power efficiency is primarily dictated by the current load and voltage drop $V_{Drop}$ across the power transistor within the LDO (see equation 17). Thus, a single LDO that provides a specific current and voltage to a load consumes approximately the same area and dissipates similar power as numerous LDOs providing the same total current and voltage to a load. Consider K on-chip distributed LDOs to maintain a regulated voltage $V_{DD}$ and load current $I_{DD}$ within a specific voltage domain ($V_{DD}$, $I_{DD}$). Let $I_i$ (i=1, . . . , K) be a local current load supplied by a single LDO within the domain, such that $\Sigma I_i = I_{DD}$. The LDO area $A_i$ is linearly proportional to the supply current $I_i$ (see equation 16), $A_i = \alpha I_i$. The K LDOs form a distributed on-chip power regulation system with a total size, $A \equiv \Sigma A_i = \alpha \cdot \Sigma I_i = \alpha \cdot I_{DD}$. Thus, the total area of the distributed regulation system does not depend on K, the number of LDOs. To maximize the power efficiency of a system, all of the LDOs operate at the minimum voltage drop $V_{Drop}$, exhibiting a total power loss $V_{Drop} \cdot \Sigma I_i = V_{Drop} \cdot I_{DD}$ which is independent of K. Alternatively, the distance between an LDO and a current load is reduced at higher values of K, decreasing the on-chip voltage drops and increasing the quality of the supplied power.

B. Number of Off-Chip Power Converters

Intuitively, the number of off-chip voltage levels increases with the larger number of off-chip converters, increasing the granularity of the voltage levels supplied to the on-chip regulators and lowering the voltage drop across the hundreds of ultra-small regulators distributed on-chip. To minimize the voltage drop across an on-chip linear regulator, each off-chip SMPS converter should drive a single on-chip LDO. In practice, however, the number of power converters that can be placed off-chip is limited. Thus, each off-chip SMPS supplies power to several on-chip LDOs within an SMPS cluster. As a result, the voltage drop across the on-chip regulators is greater, degrading the overall power efficiency of the system. The upper and lower bounds of the power efficiency of a heterogeneous system for a specific number of SMPS are described in this section.

Given N voltage domains $\{(V_{DD}^{(i)}, I_{DD}^{(i)})\}_{i=1}^{N}$ sorted by the supply voltages $V_{DD}^{(i)} < V_{DD}^{(j)} \forall i<j$, $N_L = K \cdot N$ linear power supplies should be distributed on-chip to deliver high quality power to the load circuitry. To explore the area-power efficiency tradeoff in a heterogeneous power delivery system, a single linear regulator is assumed capable of providing sufficient high quality current within a voltage domain, yielding K=1 and $N_L$=N. The voltage supplied by an LDO to a voltage domain cannot be stepped up by an LDO. The output voltage of each SMPS is therefore higher than the voltage within the individual voltage domains, increasing the voltage drop across the LDOs within an SMPS cluster, degrading power efficiency.

Figure 11:
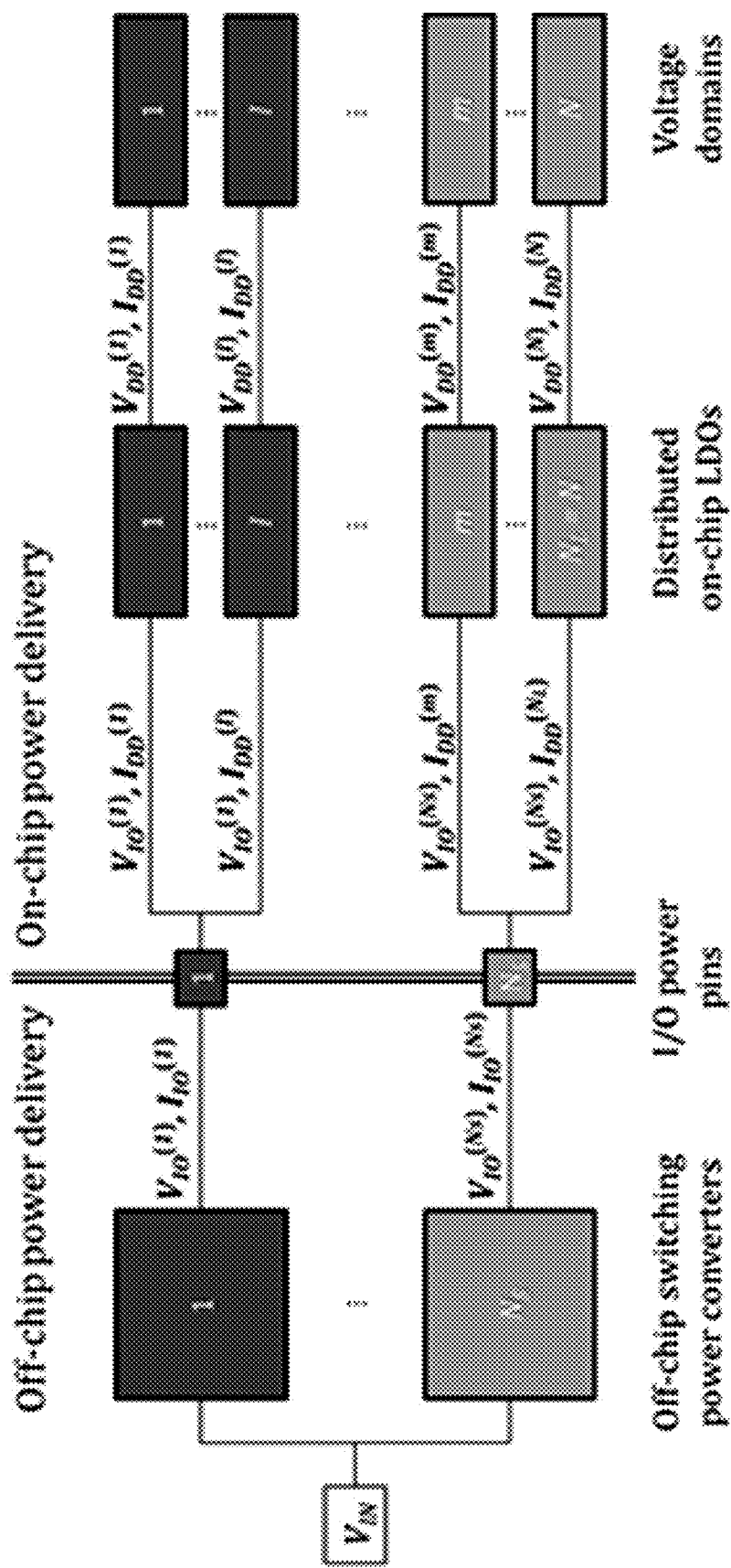
FIG. 11 shows block diagram of a model of a heterogeneous power delivery system with $N_S$ off-chip switching converters, $N_L$ on-chip linear regulators, and N on-chip voltage domains.

An expression for determining the optimal LDO clustering within the SMPS clusters is presented below. Consider $N_S$ switching power supplies to convert the off-chip input voltage $V_{IN}$ feeding $N_S$ voltage and current levels $\{(V_{IO}^{(i)}, I_{IO}^{(i)})\}_{i=1}^{N_S}$ into the input/output (I/O) power pins, as shown in FIG. 11.

To increase the power efficiency of a heterogeneous power delivery system, the voltage drops across the distributed on-chip LDOs should be reduced. The granularity of the converted voltage levels supplied on-chip increases with additional off-chip SMPS converters, reducing the power losses within the on-chip LDOs. At the limit, $N_S = N_L$ switching power converters are placed off-chip, providing voltages $\{V_{IO}^{(i)}\}_{i=1}^{N}$ at the I/O power pins, as shown in FIG. 12.

Figure 12:
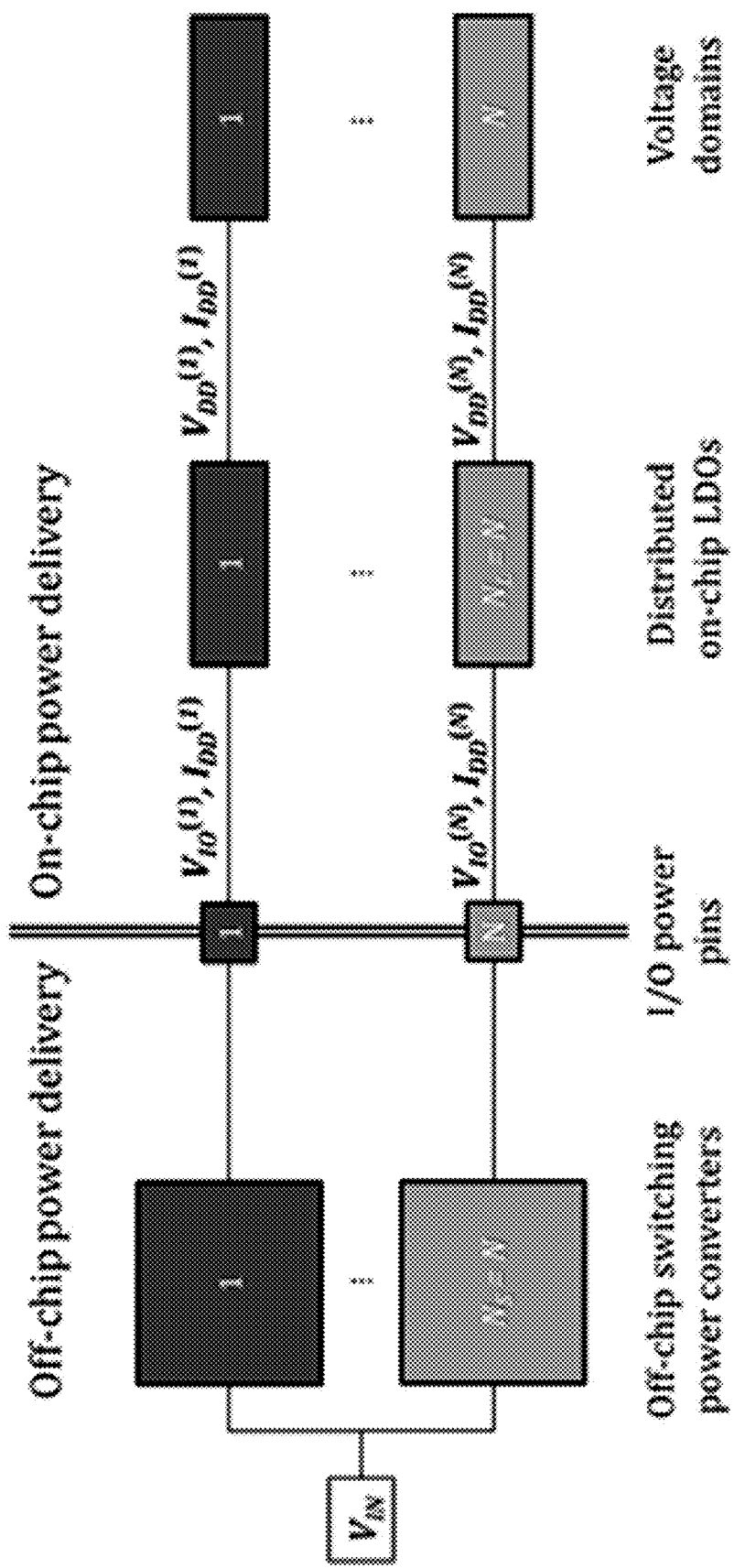
FIG. 12 shows block diagram of a heterogeneous power delivery system with an equal number of off-chip switching converters, on-chip linear regulators, and on-chip voltage domains ($N_S=N_L=N$)

In the configuration shown in FIG. 12, the on-chip LDOs operate with a minimum output voltage drop $V_T$, yielding $$V_{IO}^{(i)} = V_{DD}^{(i)} + V_T, \quad i=1,\ldots,N, \quad (18)$$

where $V_T$ is the voltage threshold of the output transistor within the LDO. Assuming ideal power efficiency of the off-chip SMPS, the power efficiency of a system with the maximum number of SMPS converters $$(N_S = N_L) \text{ is} \quad (19)$$

$$\eta_{N_S=N_L=N} = \frac{P_{Load}}{P_{IN}} = \frac{\sum_{i=1}^{N} V_{DD}^{(i)} I_{DD}^{(i)}}{\sum_{i=1}^{N_S} V_{IO}^{(i)} I_{IO}^{(i)}} = \frac{\sum_{i=1}^{N} V_{DD}^{(i)} I_{DD}^{(i)}}{\sum_{i=1}^{N} (V_{DD}^{(i)} + V_T) I_{DD}^{(i)}}.$$

In this case, the power efficiency is only limited by the threshold voltage of the transistor, and exhibits a high power efficiency for low $V_T$ devices.

Figure 13:
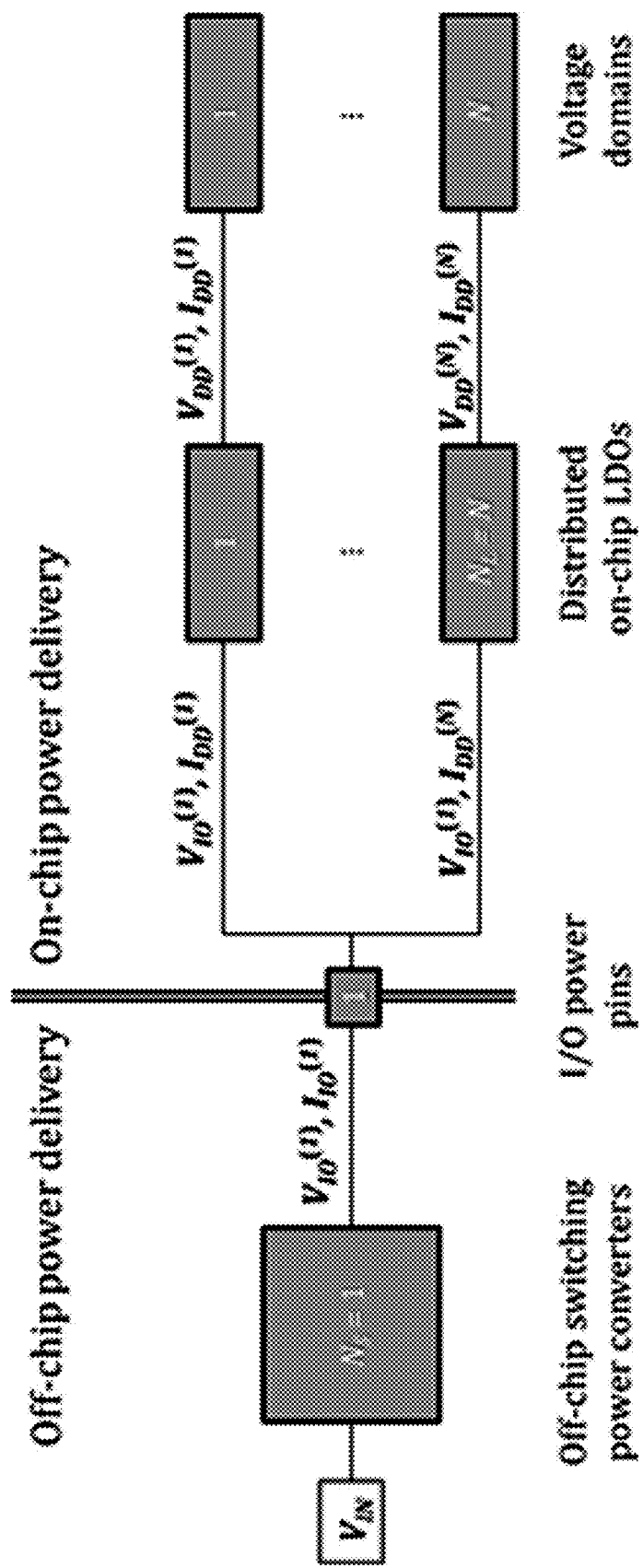
FIG. 13 shows block diagram of a heterogeneous power delivery system with a single off-chip switching converter, and an equal number of on-chip linear regulators and on-chip voltage domains ($N_S=1$, $N_L=IV$)

Area and I/O power pin constraints exist, however, that limit the number of off-chip power supplies, degrading the overall power efficiency. Let $N_{S,MAX}$ be the maximum number of off-chip switching power converters in a heterogeneous power delivery system. The worst case power efficiency scenario where $N_{S,MAX}=1$ is illustrated in FIG. 13.

To minimize the voltage drop across the on-chip LDOs for $N_S=1$, the off-chip SMPS produces a voltage $V_{IO}^{(i)}$ that is higher than the maximum domain voltage by one threshold voltage $V_T$, $$V_{IO}^{(1)} = \max\{V_{DD}^{(i)}\}_{i=1}^{N} + V_T, \quad (20)$$

exhibiting a power efficiency, $$\eta_{N_L=N, N_S=1} = \frac{P_{Load}}{P_{IN}} = \frac{\sum_{i=1}^{N} V_{DD}^{(i)} I_{DD}^{(i)}}{V_{IO}^{(1)} I_{IO}^{(1)}} = \frac{\sum_{i=1}^{N} V_{DD}^{(i)} I_{DD}^{(i)}}{\max_i\{V_{DD}^{(i)} + V_T\} \sum_{i=1}^{N} I_{DD}^{(i)}}. \quad (21)$$

In a system with a single off-chip SMPS, the power loss within each domain, in addition to the $V_T$ drop, is determined by the difference between the domain voltage and maximum voltage in the system. Those voltage domains with lower voltages exhibit greater power losses, significantly degrading the power efficiency of a heterogeneous system. The upper and lower bounds of the power efficiency of a heterogeneous system under the $N_S \leq N_{S,MAX}$ constraint are given, respectively, by (19) and (21), yielding $$\frac{\sum_{i=1}^{N} V_{DD}^{(i)} I_{DD}^{(i)}}{\max_i\{V_{DD}^{(i)} + V_T\} \sum_{i=1}^{N} I_{DD}^{(i)}} \leq \eta_{N_S,MAX} \leq \frac{\sum_{i=1}^{N} V_{DD}^{(i)} I_{DD}^{(i)}}{\sum_{i=1}^{N} (V_{DD}^{(i)} + V_T) I_{DD}^{(i)}}. \quad (22)$$

Thus, the power efficiency of a heterogeneous system is a strong function of the number of off-chip power converters.

C. Power Supply Clusters

Figure 14:
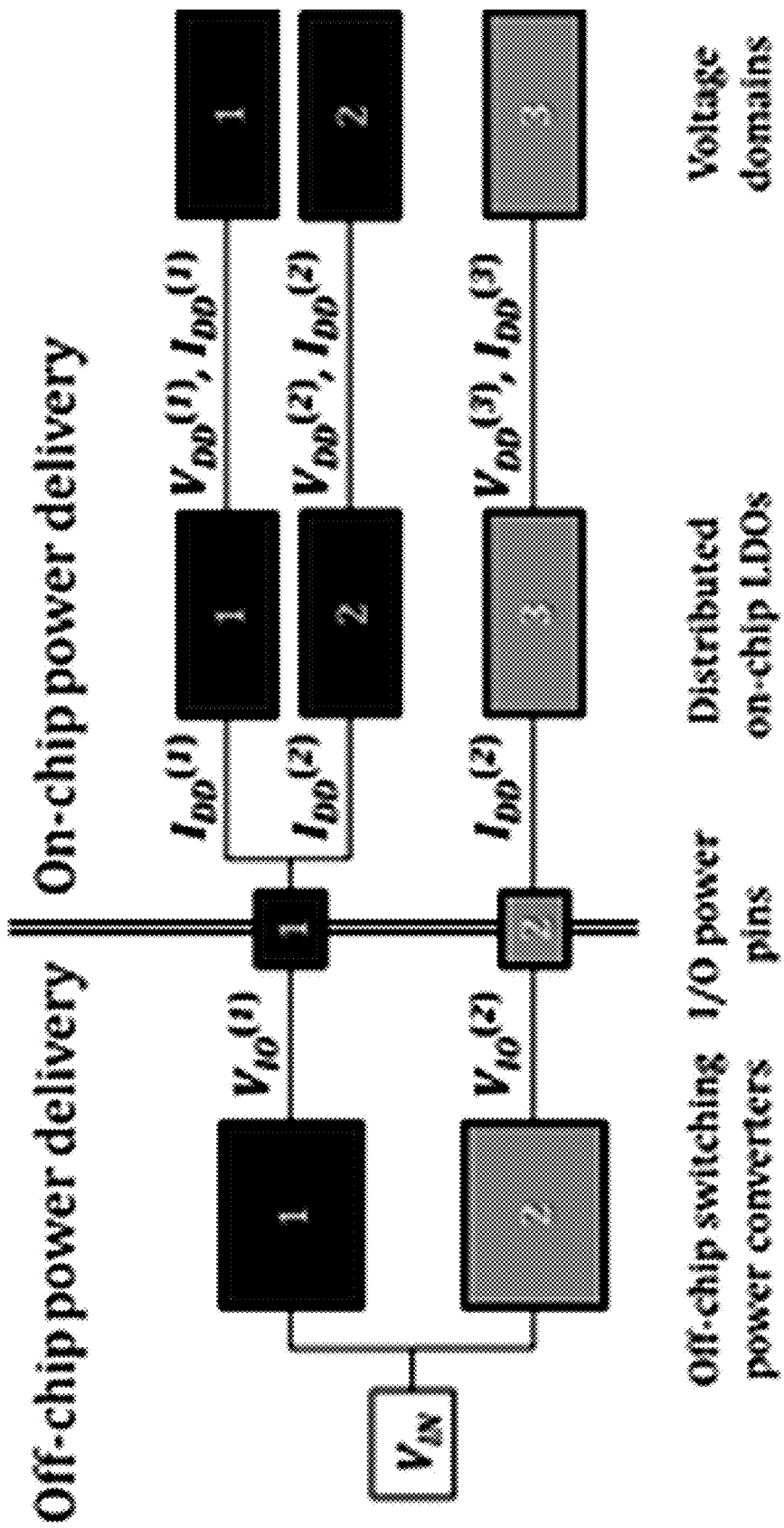
FIG. 14 shows block diagram of power supply clusterings for a heterogeneous power delivery system where NS=2, NL=N=3, and {K0=0, K1=2, K2=3}.
Figure 15:
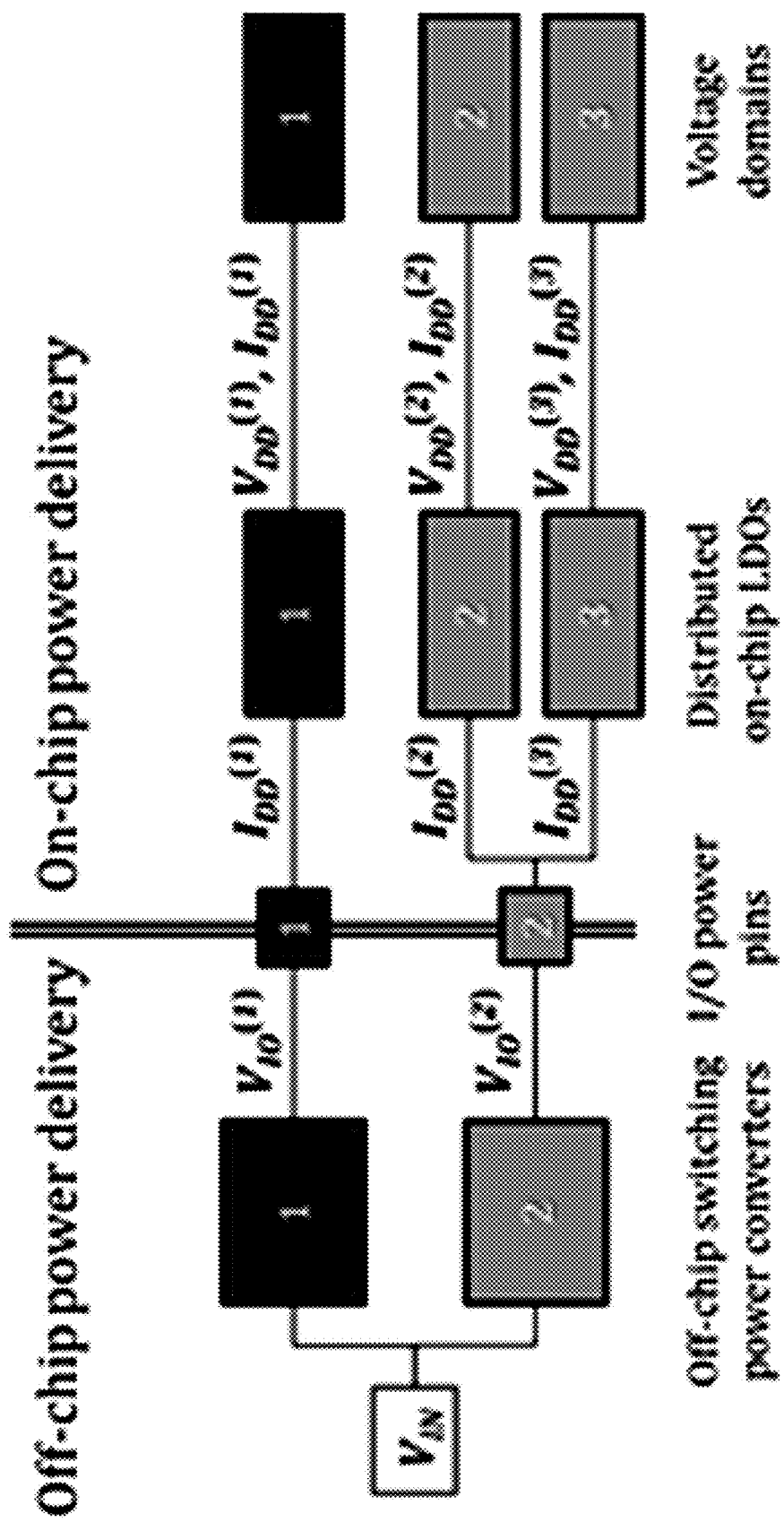
FIG. 15 shows block diagram of power supply clusterings for a heterogeneous power delivery system where NS=2, NL=N=3, and {K0=0, K1=1, K2=3}.

In a practical heterogeneous power delivery system, the number of off-chip SMPS converters is smaller than the number of on-chip LDO regulators ($N_{S,MAX} < N_L$). Thus, several options exist to distribute the on-chip LDOs within SMPS clusters. Two possible clusterings are illustrated in FIG. 14 and FIG. 15 for a heterogeneous system with two SMPS and three LDOs.

The power efficiency of a general heterogeneous power delivery system, as illustrated in FIG. 11, under the $N_S \leq N_{S,MAX}$ constraint, is $$\eta_{N_S,MAX} = \frac{P_{Load}}{P_{IN}} = \frac{\sum_{i=1}^{N} V_{DD}^{(i)} I_{DD}^{(i)}}{\sum_{i=1}^{N_{S,MAX}} V_{IO}^{(i)} I_{IO}^{(i)}} = \frac{\sum_{i=1}^{N} V_{DD}^{(i)} I_{DD}^{(i)}}{\sum_{i=1}^{N_{S,MAX}} V_{IO}^{(i)} \left(\sum_{j=K_{i-1}+1}^{K_i} I_{DD}^{(j)}\right)}, \quad (23)$$

where $\{K_i\}_{i=1}^{N_{S,MAX}}$ is the power supply clustering, $K_i - K_{i-1}$ is the number of LDO regulators driven by the $i^{th}$ SMPS converter, and $K_0 = 0$. For example, the power supply clustering in the heterogeneous power delivery system shown in FIG. 14 and FIG. 15 can be described by $\{K_0=0, K_1=2, K_2=3\}$ (FIG. 14) and $\{K_0=0, K_1=1, K_2=3\}$ (FIG. 15). In the configuration shown in FIG. 14, the first SMPS cluster contains two LDOs ($K_1-K_0=2$) that regulate voltage domains 1 and 2, and the second SMPS cluster contains an additional single LDO ($K_2-K_1=1$) that regulates the third voltage domain. Alternatively, in the configuration shown in FIG. 15, the first SMPS cluster contains a single LDO ($K_1-K_0=1$), while the other two LDOs ($K_2-K_1=2$) are distributed into the second SMPS cluster. To maximize the power efficiency $\eta_{N_S,MAX}$ of the new heterogeneous power system under the $N_S \leq N_{S,MAX}$ constraint, the input voltage for each SMPS cluster $V_{IO}^{(i)}$ that minimizes the voltage drops across the LDOs within that cluster is $$V_{IO}^{(i)} = \max\{V_{DD}^{(j)}\}_{j=K_{i-1}+1}^{K_i} + V_T, \ i=1, \ldots, N_{S,MAX}.$$

The minimum power efficiency of a heterogeneous system with distributed power supplies $\{K_i\}$, $$\eta_{N_S,MAX} = \frac{\sum_{i=1}^{N} V_{DD}^{(i)} I_{DD}^{(i)}}{\sum_{i=1}^{N_{S,MAX}} \left(\max_i\{V_{DD}^{(j)}\}_{j=K_{i-1}+1}^{K_i} + V_T\right) \sum_{j=K_{i-1}+1}^{K_i} I_{DD}^{(i)}}, \quad (25)$$

is strongly dependent on the power supply clustering $\{K_i\}N_{i=1}^{N_{S,MAX}}$.

The effect of the power supply clustering on a heterogeneous power delivery system is illustrated in FIG. 14 and FIG. 15 for different power efficiencies, yielding, respectively, $$\eta_{N_S,MAX}^{(a)} = \frac{V_{DD}^{(1)} I_{DD}^{(1)} + V_{DD}^{(2)} I_{DD}^{(2)} + V_{DD}^{(3)} I_{DD}^{(3)}}{(\max\{V_{DD}^{(1)}, V_{DD}^{(2)}\} + V_T) \cdot (I_{DD}^{(1)} + I_{DD}^{(2)}) + (V_{DD}^{(3)} + V_T) \cdot I_{DD}^{(3)}}, \quad (26)$$

and $$\eta_{N_S,MAX}^{(b)} = \frac{V_{DD}^{(1)} I_{DD}^{(1)} + V_{DD}^{(2)} I_{DD}^{(2)} + V_{DD}^{(3)} I_{DD}^{(3)}}{(V_{DD}^{(1)} + V_T) \cdot I_{DD}^{(1)} + (\max\{V_{DD}^{(2)}, V_{DD}^{(3)}\} + V_T)(I_{DD}^{(2)} + I_{DD}^{(3)})} \neq \eta_{N_S,MAX}^{(a)}. \quad (27)$$

For each SMPS converter, the voltage drop across the driven LDOs increases with a wider range of voltages included within that SMPS cluster, increasing the overall power dissipation. Intuitively, for any power supply clustering, adding a voltage domain with a specific voltage in a SMPS cluster that includes a similar voltage range results in a lower voltage drop and power loss than including the same voltage domain in a SMPS cluster with a significantly different range of voltages. Thus, the choice of power clustering directly affects the efficiency of the power delivery system. To minimize power losses in a heterogeneous power delivery system, a power distribution network with a higher $\eta_{N_S,MAX}$ is preferred.

The power efficiency of a heterogeneous system is also a strong function of the current distribution, which is not necessarily equally distributed to the individual voltage domains. Optimizing the power efficiency of a heterogeneous system based on the current distribution within the voltage domains should be based on additional assumptions regarding the behavior and specifications of the currents. One goal is to provide a framework for a power delivery methodology and specific rules for efficiently delivering power.

Part IV Algorithms for Energy Efficient Power Supply Clustering

The power efficiency of a heterogeneous power delivery system depends upon the distribution of the power supply resources. Given a power supply system with N voltage domains and a limited number of off-chip switching power converters $N_{S,MAX}$, the clustering of the $N_L \geq N_{S,MAX}$ on-chip linear regulators into $N_{S,MAX}$ SMPS clusters $K^{OPT} = \{K_i\}_{i=1}^{N_{S,MAX}}$ that minimizes the power losses should be determined. The optimal solution with minimum power losses can be obtained by exhaustively comparing the power efficiency $\eta_{N_S,MAX}$ (see equation 25) for all possible clusterings, and choosing the configuration with the maximum efficiency $\eta_{N_S,MAX}^{OPT}$, $$\eta_{N_S,MAX}^{OPT} = \max_{\substack{\text{all } \{K_i\} \\ \text{distributions}}} \{\eta_{N_S,MAX}\} = \quad (28)$$

$$\max_{\substack{\text{all } \{K_i\} \\ \text{distributions}}} \left\{ \frac{\sum_{i=1}^{N} V_{DD}^{(i)} I_{DD}^{(i)}}{\sum_{i=1}^{N_{S,MAX}} \left(\max\{V_{DD}^{(j)}\}_{j=K_{i-1}+1}^{K_i} + V_T\right) \cdot \sum_{j=K_{i-1}+1}^{K_i} I_{DD}^{(i)}} \right\}.$$

The number of possible clusterings $\{K_i\}$, however, grows exponentially with $N_{S,MAX}$, producing a computationally infeasible solution. To efficiently determine the preferable power supply clusters, alternative computationally efficient solutions are used. Binary and linear near-optimal power supply clusterings are described, respectively in Part IV.A and Part IV.B.

A. Binary Power Supply Clustering

Intuitively, to reduce the voltage drop across the on-chip LDOs, LDOs that regulate the voltage domains with a small difference in voltage levels should be assembled into a voltage cluster driven by the same SMPS, minimizing the voltage range within each cluster. A binary power supply clustering, based on a greedy algorithm, identifies in each step the voltage cluster with the widest voltage range and distributes the LDOs into two separate clusters. Exemplary pseudo-code of the algorithm for binary power supply clustering is:

List_of_Clusters = binary_power_supply_clustering (sorted supply voltages $\{V_{DD}^{(i)}\}_{i=1...N}$)
1. Next_Cluster_to_Distribute = $(V_{DD}^{(i)})_{i=1...N}$
2. List_of_Clusters = { Next_Cluster_to_Distribute }
3. (New_Low_Cluster, New_High_Cluster) = distribute_a_cluster (Next_Cluster_to_Distribute)
4. List_of_Clusters += New_Low_Cluster + New_High_Cluster − Next_Cluster_to_Distribute
5. If number of clusters in List_of_Clusters < $N_{S,MAX}$
    5.1 Find Cluster in List_of_Clusters such that (max{Cluster} − min{Cluster}) is maximal
    5.2 Next_Cluster_to_Distribute = Cluster
    5.3 Return to 3.
(New_Low_Cluster, New_High_Cluster) = distribute_a_cluster (Next_Cluster_to_Distribute)
1. $V_{Mean}$ = ½ (min{Next_Cluster_to_Distribute} + max{Next_Cluster_to_Distribute})
2. New_Low_Cluster = $\{V_{DD}^{(i)} \in$ Next_Cluster_to_Distribute | $V_{DD}^{(i)}) \leq V_{Mean}\}$
3. New_High_Cluster = $\{V_{DD}^{(i)} \in$ Next_Cluster_to _Distribute | $V_{DD}^{(i)}) > V_{Mean}\}$ The algorithm produces a set of $N_{S,MAX}$ SMPS voltage clusters List_of_Clusters with a binary clustering of power supplies. The third step is executed $N_{S,MAX}$ times, yielding an algorithm that exhibits linear complexity $O(N_{S,MAX})$ with the number of switching converters.

B. Linear Power Supply Clustering

The primary weakness of the binary power supply clustering is the greedy nature of the algorithm. The number of voltage clusters $N_{S,MAX}$ is only considered when the algorithm is terminated, reducing the power efficiency of the overall power delivery system. Consider a heterogeneous power delivery system with three switching converters and four LDO regulators that supply power to four voltage domains. The voltage and current levels within the voltage domains are (1 volt, 1 ampere), (1.49 volts, 1 ampere), (1.51 volts, 1 ampere), and (2 volts, 1 ampere). The optimal and binary power supply clusterings, SMPS output voltages, and power efficiency are summarized in Table 1, exhibiting, respectively, 91% and 85% power efficiency for $V_T$=0.2 volts [from (25)].

Table 1 shows power supply clustering for a heterogeneous power delivery system with $N_S$=3, $N_L$=N=4, and voltage domains (1 volt, 1 ampere), (1.49 volts, 1 ampere), (1.51 volts, 1 ampere)

and (2 volts, 1 ampere), (a) $\{K_0=0, K_1=1, K_2=3, K_3=4\}$, and (b) $\{K_0=0, K_1=2, K_2=3, K_3=4\}$:

TABLE 1

| | Power supply clustering $\{K_0, K_1, K_2, K_3\}$ | SMPS output voltages $\{V_{IO}^{(1)}, V_{IO}^{(2)}, V_{IO}^{(3)}\}$ [Volts] | Power efficiency [%] |
|---|---|---|---|
| Binary power supply clustering | {0, 1, 3, 4} | $\{1 + V_T, 1.51 + V_T, 2 + V_T\}$ | 91 |
| Optimal power supply clustering | {0, 2, 3, 4} | $\{1.49 + V_T, 1.51 + V_T, 2 + V_T\}$ | 85 |

Alternatively, a linear power supply clustering produces a topology by linearly distributing the LDOs within $N_{S,MAX}$ voltage clusters, as described by the algorithm for linear power supply clustering represented by the pseudo-code provided as follows:

List_of_Clusters = linear_power_supply_clustering (sorted supply voltages $\{V_{DD}^{(i)}\}_{i=1...N}$)
1. List_of_Clusters = $\{(\ )^{(i)}\}_{i=1...N}$      % $N_{S,MAX}$ empty clusters
2. Cluster_Range = ( max$\{V_{DD}^{(i)}\}_{i=1...N}$ − min$\{V_{DD}^{(i)}\}_{i=1...N}$) / $N_{S,MAX}$
3. For each $V_{DD} \in \{V_{DD}^{(i)}\}_{i=1...N}$
    3.1 k = $\lfloor$ ( $V_{DD}$ − min $\{V_{DD}^{(i)}\}_{i=1...N}$) / Cluster_Range $\rfloor$ + 1
    3.2 Add $V_{DD}$ to the $k^{th}$ cluster in List_of_Clusters
4. If number of non-empty clusters in List_of_Clusters < $N_{S,MAX}$
    4.1 Find Cluster in List_of_Clusters such that (max{Cluster} − min{Cluster}) is maximum
    4.2 Next_Cluster_to_Distribute = Cluster
    4.3 (New_Low_Cluster, New_High_Cluster) = distribute_a_cluster (Next_Cluster_to_Distribute)
    4.4 List_of_Clusters += New_Low_Cluster + New_ High_Cluster − Next_Cluster_to_Distribute
    4.5 Return to 4.

If less than $N_{S,MAX}$ SMPS voltage clusters are produced within steps 1 through 3 in the linear power supply clustering algorithm, the linearly generated clusters are distributed into additional clusters using a binary algorithm. This algorithm produces a set of $N_{S,MAX}$ SMPS voltage clusters List_of_Clusters with a linear power supply clustering. In the worst case, the third and fourth steps are executed, respectively, N and $N_{S,MAX}$ times, yielding an algorithm complexity that is linear with the number of voltage domains, O(N).

In modern ICs, advanced power techniques, such as dynamic voltage scaling (DVS) and dynamic voltage and frequency scaling (DVFS), are often employed [36]. In some embodiments, to apply the binary or linear algorithm in a heterogeneous system with dynamically changing voltage levels, the average voltage level for each voltage domain is used. Once the power supply clusters are determined with either the binary or linear algorithm based on average domain voltage levels, the maximum voltage level within each SMPS cluster determines the SMPS output voltage. In some embodiments, the drop in efficiency of the algorithms is likely to be higher in a power system with dynamically changing voltage levels as compared to a power system with fixed operating conditions Part V Simulation Results The optimal exhaustive power delivery network and the near-optimal solutions described in Section IV were implemented in MATLAB™ (available from The Mathworks, Inc. of Natick, Mass.). To compare the power efficiency of the near-optimal and optimal power delivery networks, a heterogeneous power delivery system with a small number of voltage domains is considered in Part V.A due to the computational complexity of the exhaustive optimal algorithm. To evaluate the power efficiency of the linear, binary, and hybrid clusterings, heterogeneous power delivery systems with larger number of voltage domains as described herein are considered in Part V.B.

A Power Efficiency in Optimal and Near-Optimal Power Delivery Networks

Figure 16:
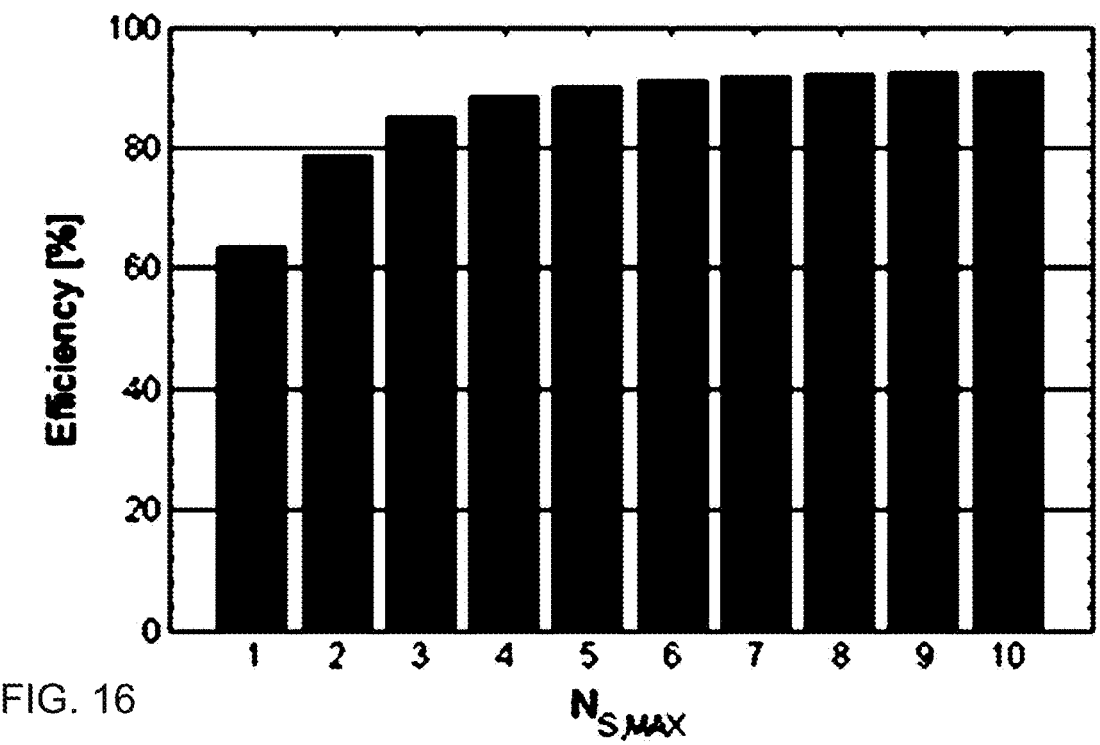
FIG. 16 shows a histogram of a heterogeneous power delivery system average efficiency using an exhaustive power supply clustering algorithm.

The exhaustive algorithm determines the most power efficient clustering by comparing the power efficiency of all the possible clusterings. The efficiency of the optimal power network produced by the exhaustive algorithm is compared in this section to the power efficiency of the near-optimal clustering algorithms. To estimate the power efficiency of the optimal power supply clusters, a heterogeneous power delivery system $S_1$ with ten voltage domains (N=10) and ten on-chip linear regulators ($N_L$=10) is considered. The maximum number of off-chip switching converters is evaluated for one to ten converters ($1 \leq N_{S,MAX} \leq 10$). A voltage threshold of $V_T$=0.1 volts, and domain voltages and currents of, respectively, 0.5 volts to 2 volts and 0.5 amperes to 3.5 amperes, are considered. Simulation results are sampled for 100 iterations. The power efficiency of a heterogeneous power delivery system with the power supply clusters, determined by an exhaustive analysis, is presented in FIG. 16. A power efficiency above 80% is demonstrated for $N_{S,MAX} \geq 2$, and a maximum 93% power efficiency is achieved for $N_{S,MAX}$=N. Thus, the power efficiency of a heterogeneous power delivery system with an optimal power clustering exhibits a reasonable power efficiency of 80%, using only two off-chip switching converters. The efficiency increases rapidly with additional off-chip converters.

Figure 17:
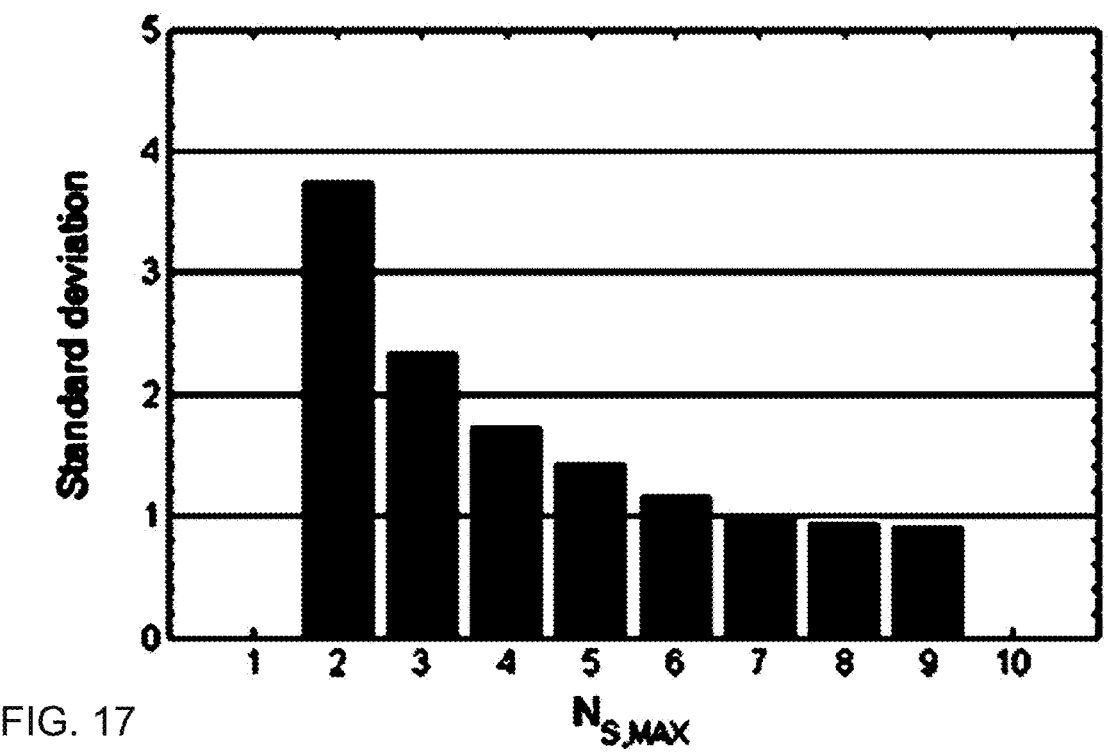
FIG. 17 shows a histogram of a heterogeneous power delivery system standard deviation using an exhaustive power supply clustering algorithm.

Based on the Monte Carlo integration technique [37], the average error in the efficiency is bounded by $\sigma_M/\sqrt{M}$, where $\sigma_M$ is the standard deviation of a power efficiency sample and M is the number of samples. The standard deviation of the power efficiency is shown in FIG. 17 for $2 \leq N_{S,MAX} \leq 9$. Values of $\sigma_M$ range from 3.7 for $N_{S,MAX}$=2 to 0.9 for $N_{S,MAX}$=9, bounding the power efficiency error for M=100 by, respectively, 0.37% to 0.09%. Power supply clustering for $N_{S,MAX}$=1 and $N_{S,MAX}$=N is explicit, yielding no error in the power efficiency.

Figure 18A:
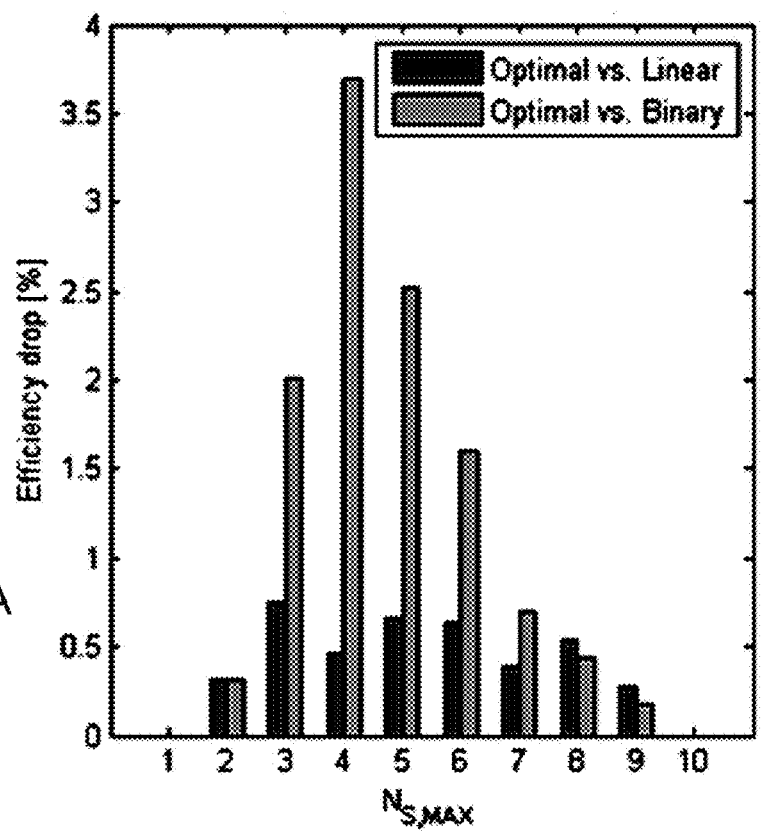
FIG. 18A shows a histogram illustrating a decrease in linear and binary power efficiency from the optimal power efficiency for randomly distributed voltage levels.

To evaluate the power efficiency of the near-optimal power supply clustering topologies described in Part IV, algorithms for binary and linear power supply clusterings have also been implemented in MATLAB™. The same heterogeneous system $S_1$ is considered for both linear and binary distributed power supplies. For heterogeneous system with a single off-chip SMPS converter ($N_{S,MAX}$=1) or maximum number of off-chip SMPS converters ($N_{S,MAX}$=$N_L$), the linear, binary, and optimal clustering of the on-chip LDO regulators is identical. For $N_{S,MAX}$=1, all of the LDOs are driven by a single SMPS converter, while for $N_{S,MAX}$=$N_L$, each LDO is driven by a different SMPS converter. Thus, the power efficiency of a heterogeneous system with $N_{S,MAX}$=1 or $N_{S,MAX}$=N is optimal with either the linear or binary power supply clustering. Alternatively for $N_{S,MAX}<N_L$, the linear and binary clustering of the power supplies may differ from the exhaustive optimal solution, exhibiting a lower than optimal power efficiency. Due to the uniform nature of the linear approach, the linear clustering of the on-chip LDO regulators within the off-chip SMPS converters exhibits near optimal efficiency for power delivery systems with near uniformly distributed domain voltages. Alternatively, for a power delivery system with domain voltages that exhibit significant deviation from a uniform distribution, the power efficiency with the binary power supply clustering may be higher than with the linear clustering. This behavior is due to the greedy nature of the binary approach that iteratively identifies the on-chip power supply cluster with the lowest power efficiency and splits the cluster, increasing the overall efficiency of the system. To demonstrate the power efficiency of the binary and linear clusterings, the reduction in efficiency with both the binary and linear power supply clustering is simulated for two different power profiles, exhibiting a maximum 4% drop in power efficiency. The optimal solution with zero reduction in power efficiency is demonstrated for both power profiles in FIG. 18A and FIG. 18B for $N_{S,MAX}$=1 and $N_{S,MAX}$=$N_L$. In the first power profile, the voltage levels are assumed to be randomly distributed between 0.5 volts and 2 volts, yielding an average power efficiency generated from over 100 iterations, as depicted in FIG. 18A. In this case, for $1<N_{S,MAX}<N_L$, the exhaustive optimal solution produces a power supply that is uniformly distributed, and the linear power supply clustering yields a higher power efficiency.

Figure 18B:
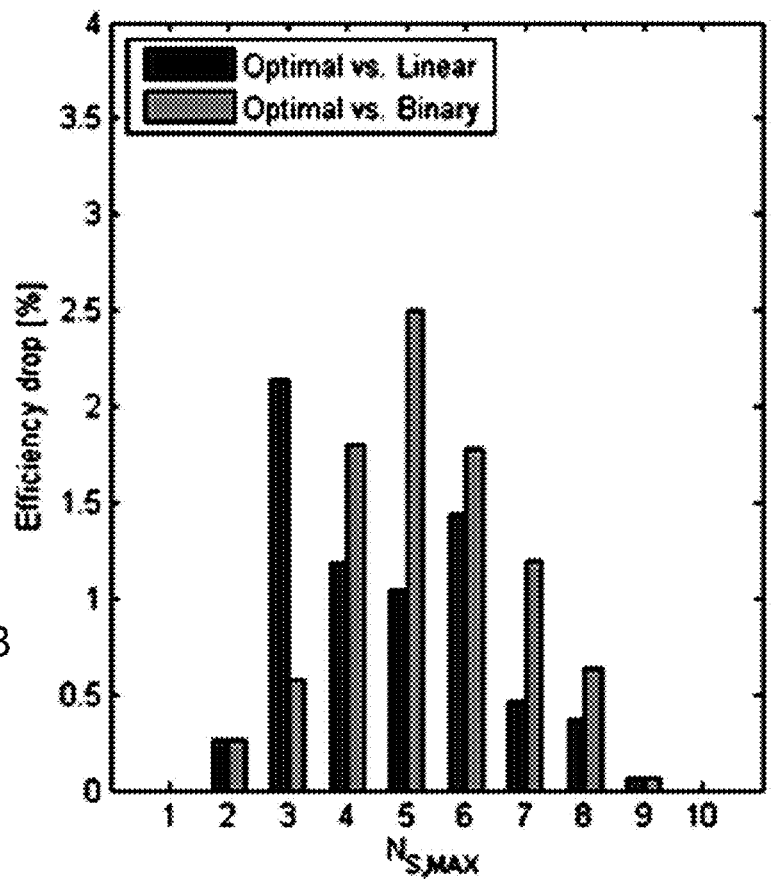
FIG. 18B shows a histogram illustrating a decrease in linear and binary power efficiency from the optimal power efficiency for voltage levels grouped within three voltage ranges.
Figures 19A, 19B, 19C, 19D:
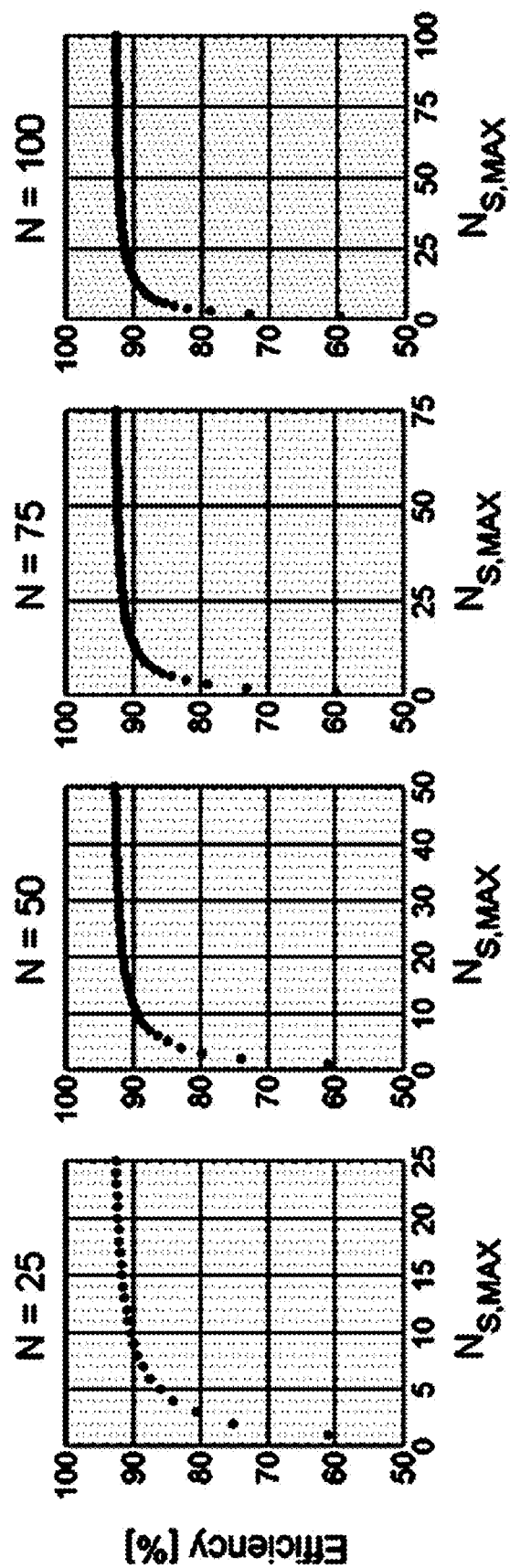
FIG. 19A shows a graph of linear and binary power efficiency for 25 voltage domains.
FIG. 19B shows a graph of linear and binary power efficiency for 50 voltage domains.
FIG. 19C shows a graph of linear and binary power efficiency for 75 voltage domains.
FIG. 19D shows a graph of linear and binary power efficiency for 100 voltage domains.

In the second power profile, the voltage levels are assumed to be normally distributed within each of the [0.5, 1.5], [1.5, 1.8], and [1.8, 2] ranges, prioritizing the mean value of the groups. Due to the non-uniform clustered nature of the voltage domain profile, for a heterogeneous system with three off-chip SMPS converters, intuitively, the on-chip LDO regulators should be non-uniformly distributed into three clusters covering the ranges [0.5, 1.5], [1.5, 1.8], and [1.8, 2]. In this case, a system with uniformly distributed clusters with voltage ranges [0.5, 1], [1, 1.5], [1.5, 2] is less power efficient. This heterogeneous system is therefore more suitable for a binary power supply clustering rather than a linear power supply clustering. The average power efficiency for the second power profile, generated from over 100 iterations, is depicted in FIG. 18B. In this case, specifically for $N_{S,MAX}=3$, the optimal solution produces three non-uniform SMPS clusters, covering the three ranges, [0.5, 1.5], [1.5, 1.8], and [1.8, 2]. The binary power supply clustering with $N_{S,MAX}=3$ also produces three SMPS clusters with voltage ranges, [0.5, 1.25], [1.25, 1.625], and [1.625, 2], exhibiting a higher power efficiency than the efficiency of the linear power supply clustering. Based on a Monte Carlo integration technique, the error in estimating the drop in power efficiency, illustrated in FIG. 18B, is smaller than 0.63% for all values of $N_{S,MAX}$.

Due to the greedy nature of the binary power supply clustering, the binary algorithm is better for those voltage domain levels grouped near specific voltage levels. Alternatively, the number of SMPS clusters $N_{S,MAX}$ is only considered at the termination of the binary algorithm, potentially reducing the effectiveness of the binary clustering algorithm in those systems with uniformly distributed voltage domains. As expected, for most values of $N_{S,MAX}$ and power supply specifications, the drop in power efficiency for the linear power supply clustering algorithm is lower than with the binary approach. However, the second power profile that forms three non-uniform voltage groups is better addressed by the binary power supply clustering algorithm, producing a more efficient heterogeneous power delivery system for $N_{S,MAX}=3$. Thus, a heterogeneous power delivery system with a higher power efficiency is usually produced with a linear power supply clustering. However, for certain power profiles, a binary power supply clustering is preferable.

To increase the power efficiency of a heterogeneous power delivery system, a combined hybrid approach should be employed. The power efficiency should be evaluated with both the binary and linear algorithms, and the configuration with the higher power efficiency should be employed. Analyzing the results depicted in FIG. 18A and FIG. 18B based on this combined hybrid approach, the drop in power efficiency from the optimal solution is reduced to 1.5%, yielding a computationally efficient, $O(N_{S,MAX}+N)$ complexity, near-optimal, and high fidelity power supply clustering.

B. Power Efficiency with Binary, Linear and Hybrid Clusterings

The power efficiency of a heterogeneous power delivery system $S_2$ with 25, 50, 75, and 100 voltage domains is presented in FIG. 19A, FIG. 19B, FIG. 19C, and FIG. 19D, exhibiting a maximum power efficiency of 93% for $N_{S,MAX}=N$. A reasonable on-chip power efficiency of 79% is therefore achievable using only a small number ($N_{S,MAX}>2$) of switching converters when the on-chip power supplies are distributed using a combined hybrid binary and linear clustering algorithm.

The power efficiency exhibits a similar behavior for 25, 50, 75, and 100 voltage domains, as shown in FIG. 19A, FIG. 19B, FIG. 19C, and FIG. 19D. For a specific number of voltage domains N and on-chip LDO regulators ($N_L=N$), the number of LDOs within each SMPS cluster decreases with a larger number of off-chip SMPS converters ($1 \leq N_{S,MAX} \leq N$). As a result, the maximum voltage drop across the on-chip LDOs is less, decreasing the losses within the power delivery system.

Figure 20:
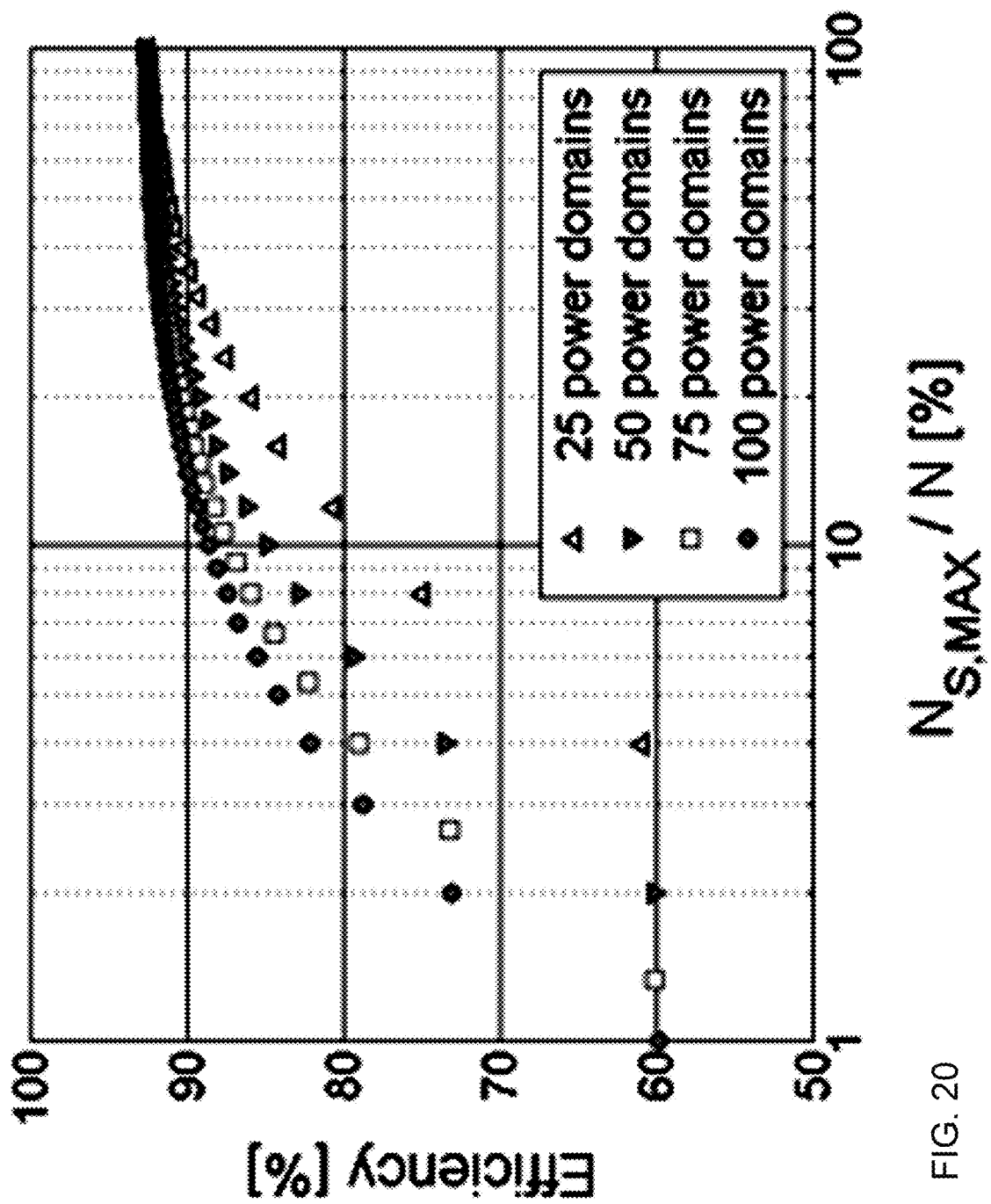
FIG. 20 shows a graph of linear and binary power efficiency vs. the $N_{S,MAX}/N$ ratio for 25, 50, 75, and 100 voltage domains.

The power efficiency, illustrated in FIG. 19A, FIG. 19B, FIG. 19C, and FIG. 19D, increases rapidly with a larger number of off-chip converters and saturates for $N_{S,MAX}>\frac{1}{2}N$ for 25, 50, 75, and 100 voltage domains. To avoid the redundancy of the off-chip power supplies, the power efficiency trend as a function of the $N_{S,MAX}/N$ ratio, shown in FIG. 20, considers a heterogeneous system with 25, 50, 75, and 100 voltage domains. Targeting a specific ratio between the number of off-chip power converters and on-chip voltage domains, the overall power efficiency of the system increases with a larger number of voltage domains. For example, for a heterogeneous power system with 25 voltage domains and a limited number of off-chip SMPS converters ($N_{S,MAX}=8\% \cdot N$), a moderate power efficiency of 75% is noted. Alternatively, in a power delivery system with 100 voltage domains and the same $N_{S,MAX}/N$ ratio, a higher power efficiency of 84% is observed. The efficiency of a heterogeneous systems with a different number of voltage domains decreases with higher $N_{S,MAX}/N$ ratios, becoming insignificant for $N_{S,MAX}/N>50\%$. The current load at the output of an LDO is assumed to be the total current consumed by the voltage domain, and is therefore significantly greater than the quiescent current of an LDO. Alternatively, by clustering hundreds of ultra-small power regulators, lower LDO output currents are expected. As a result, the effect of the quiescent current on the LDO power efficiency increases, degrading the maximum efficiency of the overall heterogeneous power delivery system. In addition, the drop in efficiency of the hybrid binary and linear clustering algorithm increases in heterogeneous systems with dynamically changing voltage and current specifications, lowering the overall power efficiency of the system. Thus, a heterogeneous power delivery system with a more complex distributed power supply system and accurate specifications should be considered as a robust power delivery methodology.

Part VI Summary

On-chip power integration is necessary for delivering high quality power to modern high performance circuits. With on-chip power supplies, new design challenges have arisen that require advanced circuit design solutions. A power delivery topology has been described hereinabove which minimizes power conversion and regulation losses while satisfying specific design constraints. Accurate, computationally efficient methods to distribute on-chip power supplies have also been described.

The tradeoff between power efficiency and area for switching and linear power supplies is discussed in this paper. To convert power with minimum power losses while avoiding area consuming on-chip passive components, power efficient SMPSs should be placed off-chip. In addition, area efficient LDOs should be employed on-chip to regulate and deliver the converted power to the load circuitry, reducing power losses from the low voltages dropped across the LDOs. Thus, to maintain high quality on-chip power delivery, the power conversion and regulation operations should be decoupled. Based on this decoupling principle of power conversion and regulation, a heterogeneous power delivery system has been described as a solution to the problem of efficiently managing IC power delivery. To optimize a specific heterogeneous system given the number of voltage domains and off-chip SMPS, clustering of the on-chip LDOs within the SMPS clusters can maximize the power efficiency of the overall system.

An exhaustive solution that produces the on-chip power supply clusterings with the highest power efficiency is, however, computationally inefficient. Thus, computationally efficient binary and linear algorithms for determining a near-optimal heterogeneous power supply clustering have been described hereinabove, which when combined exhibit a drop in power efficiency of less than 1.5% from the optimal solution. A power efficiency above 80% was demonstrated for power delivery systems with more than two off-chip switching converters. Power efficiency has also been shown to increase rapidly with additional SMPS converters and voltage domains, saturating when the number of off-chip converters exceeds 50% of the voltage domains. A hybrid methodology for linear and binary heterogeneous power delivery can therefore be employed to determine the preferred number of voltage domains and the efficient clustering of the on-chip power supplies in large scale systems. A heterogeneous integrated power delivery system has been shown to be a power efficient alternative to existing topologies that employ either switching or linear on-chip power supplies.

POWER NETWORK ON-CHIP SYSTEM FOR SCALABLE POWER DELIVERY

Part I Introduction

The delivery of high quality power to the on-chip circuitry with minimum energy loss is an important component of integrated circuits. To facilitate the integration of diverse functions, architectural, circuit, device, and material level power delivery solutions are needed. The quality of the power supply can be efficiently addressed with point-of-load (POL) distributed power delivery [40, 41], which requires on-chip integration of multiple power supplies. Distributed power delivery requires the co-design of hundreds of power converters with thousands of decoupling capacitors and billions of current loads within multiple power domains, significantly increasing the design complexity of power delivery systems. Per core dynamic voltage and frequency scaling is a primary concern for efficiently managing a power budget, and requires the on-chip integration of compact controllers within hundreds of power domains and thousands of cores, further increasing the design complexity of these power delivery systems. While in-package and on-chip power integration has recently became a primary concern [38, 39], research remains focused on developing more compact and efficient power supplies. A methodology to design and manage in-package and on-chip power has to date not been a topic of emphasis. Thus, power delivery in modern ICs is currently dominated by ad hoc approaches. With the increasing number of power domains, the greater granularity of the on-chip supply voltages, and domain adaptive power requirements, the design of the power delivery process has greatly increased in complexity, and is impractical without a systematic methodology. One objective described in detail herein is to provide a systematic methodology for on-chip power delivery and management.

Figure 21:
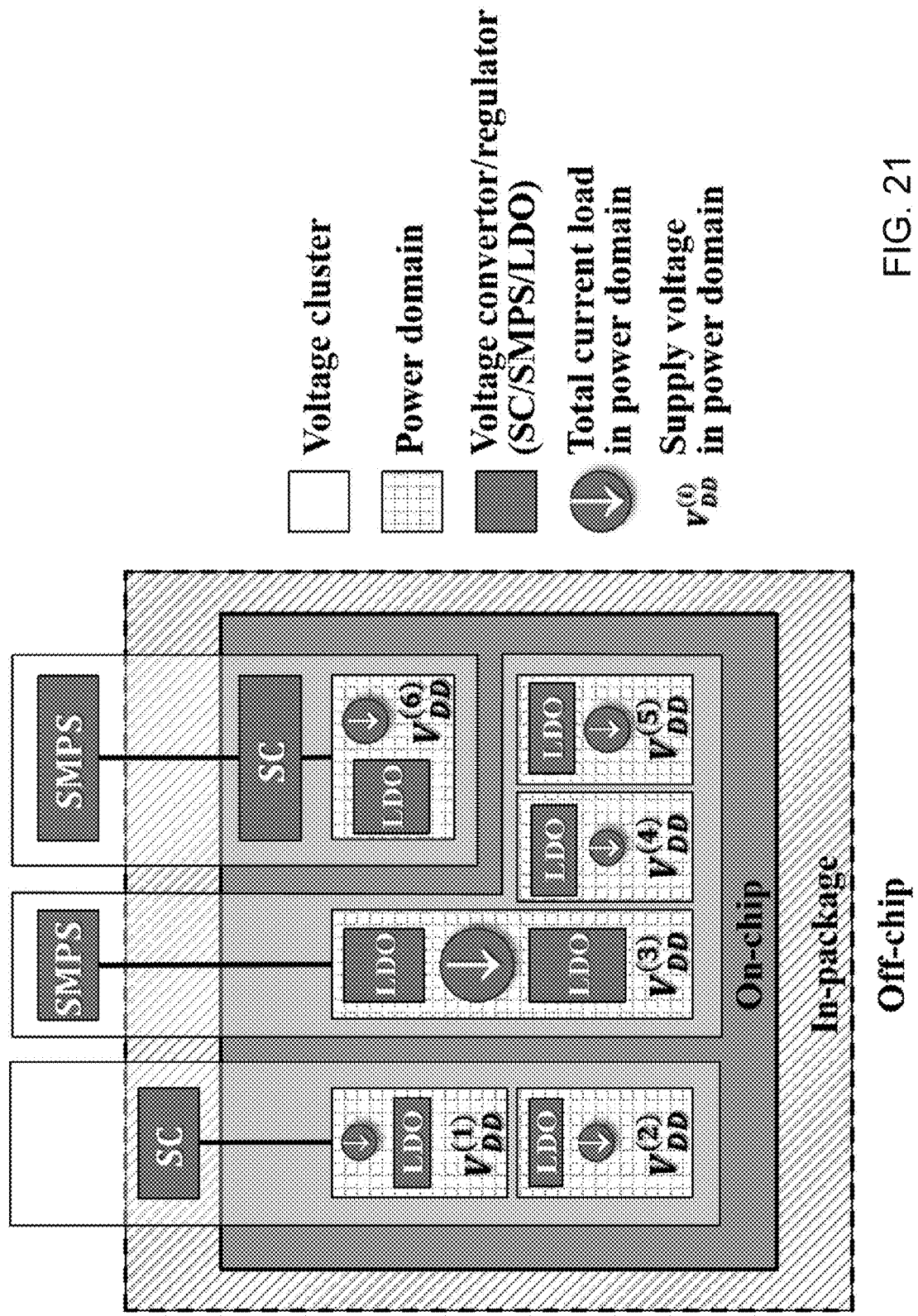
FIG. 21 shows a block diagram of an exemplary heterogeneous power delivery system with two switching mode power supplies (SMPS), two switched capacitor (SC) voltage converters, seven low dropout regulators (LDO), and six power domains grouped into three voltage clusters.

To cope with design complexity in functional communication, the concept of "separation of different concerns" is used—a fundamental and cost effective approach for increasing performance and design productivity since the complexity of ad hoc solutions has become excessively high. Specifically, networks-on-chip (NoC) separate computation from communication, enhancing the performance, scalability, and control of the quality of service (QoS), while supporting heterogeneous integrated systems. Recently, a principle of separation of power conversion and regulation has been introduced [45] that addresses the issue of power efficiency in distributed power supply systems. Consistent with this separation principle, power should be primarily converted with a few power efficient switching supplies, delivered to on-chip voltage clusters, and regulated with linear low dropout (LDO) regulators within the individual power domains, as illustrated in FIG. 21.

Figure 22B:
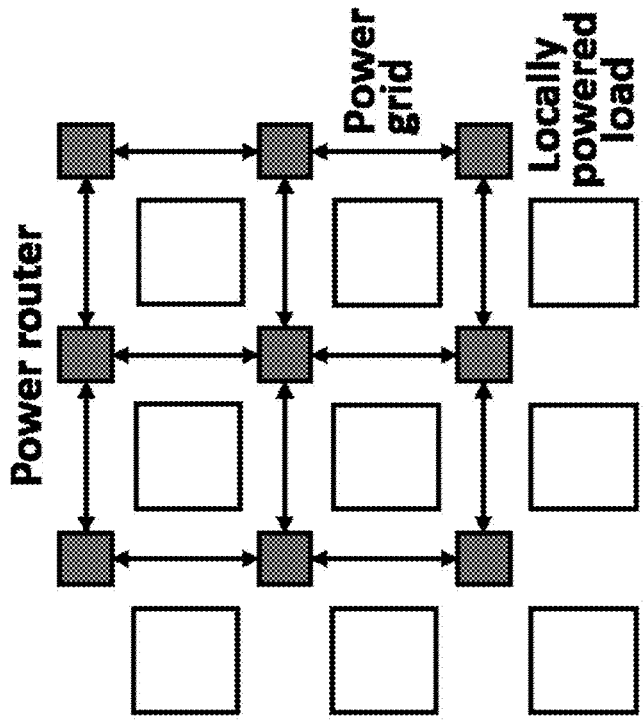
FIG. 22B shows a block diagram of an on-chip networks based on the approach of separation of functionality in a power network-on-chip (PNoC)
Figure 22A:
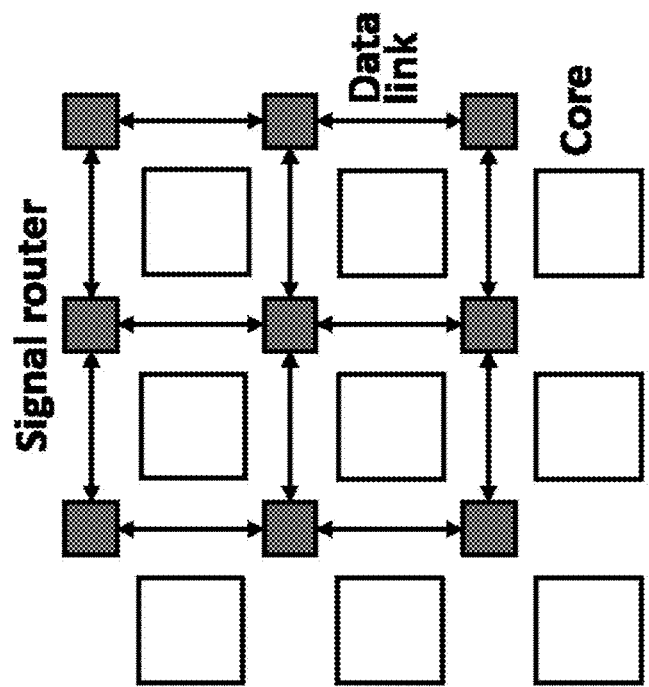
FIG. 22A shows a block diagram of an on-chip networks based on the approach of separation of functionality in a network-on-chip (No C)

The concept of a power network on-chip (PNoC) is introduced here based on this separation principle. The analogy between a NoC and PNoC is illustrated in FIG. 22A and FIG. 22B with simplified NoC and PNoC models. Similar to a network-on-chip, a PNoC decreases the design complexity of power delivery systems, while enhancing the control of the quality of power (QoP) and dynamic voltage scaling (DVS), and providing a scalable platform for efficient power management.

The description is organized as follows. The principles of the PNoC design methodology are described in Part II. In Part III, the performance of the PNoC architecture is compared with existing approaches based on the evaluation of several test cases. Design and performance issues of the PNoC architecture are also discussed. Some concluding remarks are offered in Part IV.

Part II Power Network-On-Chip Architecture.

Figure 23B:
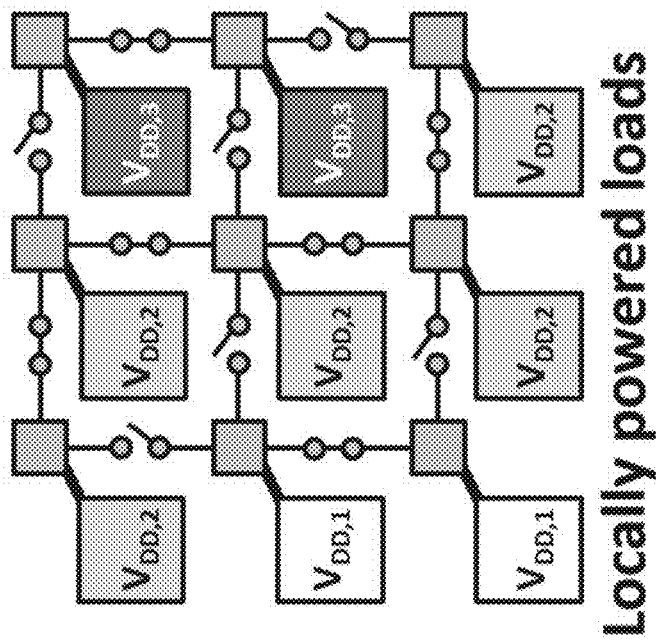
FIG. 23B shows a block diagram of an exemplary on-chip power network with multiple locally powered loads and three supply voltage levels in a PNoC configuration at time $t_2$.
Figure 23A:
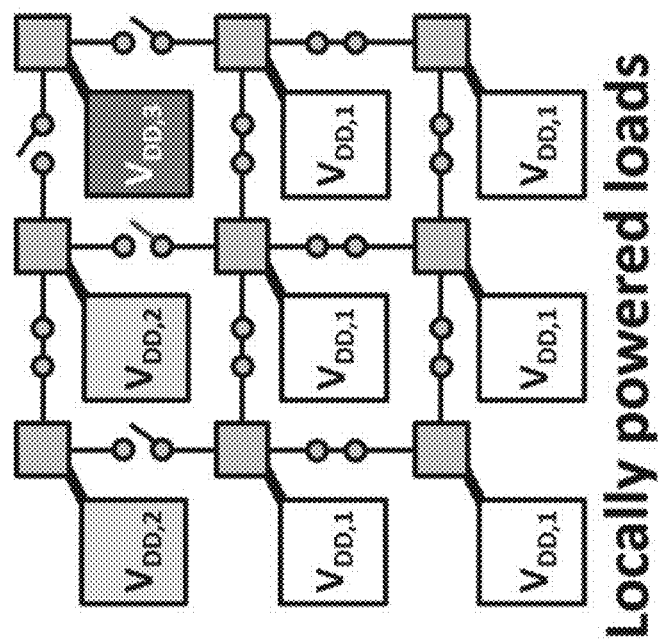
FIG. 23A shows a block diagram of an exemplary on-chip power network with multiple locally powered loads and three supply voltage levels in a PNoC configuration at time $t_1$.

An important concept in systemizing the design of power delivery is to convert the power off-chip, in-package, and/or on-chip with multiple power efficient but large switching power supplies, deliver the power to on-chip voltage clusters, and regulate the power with hundreds of linear low dropout (LDO) regulators at the point-of-load [45]. A power network-on-chip as described herein is believed to be a new systematic solution to on-chip power delivery that leverages distributed point-of-load power delivery within a fine grained power management framework. The PNoC architecture is a mesh of power routers and locally powered loads, as depicted in FIG. 22A and FIG. 22B. The power routers are connected through power switches, distributing current to those local loads with similar voltage requirements. A PNoC is illustrated in FIG. 23A and FIG. 23B for a single voltage cluster with nine locally powered loads and three different supply voltages, $V_{DD,1}$, $V_{DD,2}$, and $V_{DD,3}$. The power network configuration is shown at two different times, $t_1$ and $t_2$.

Figure 24:
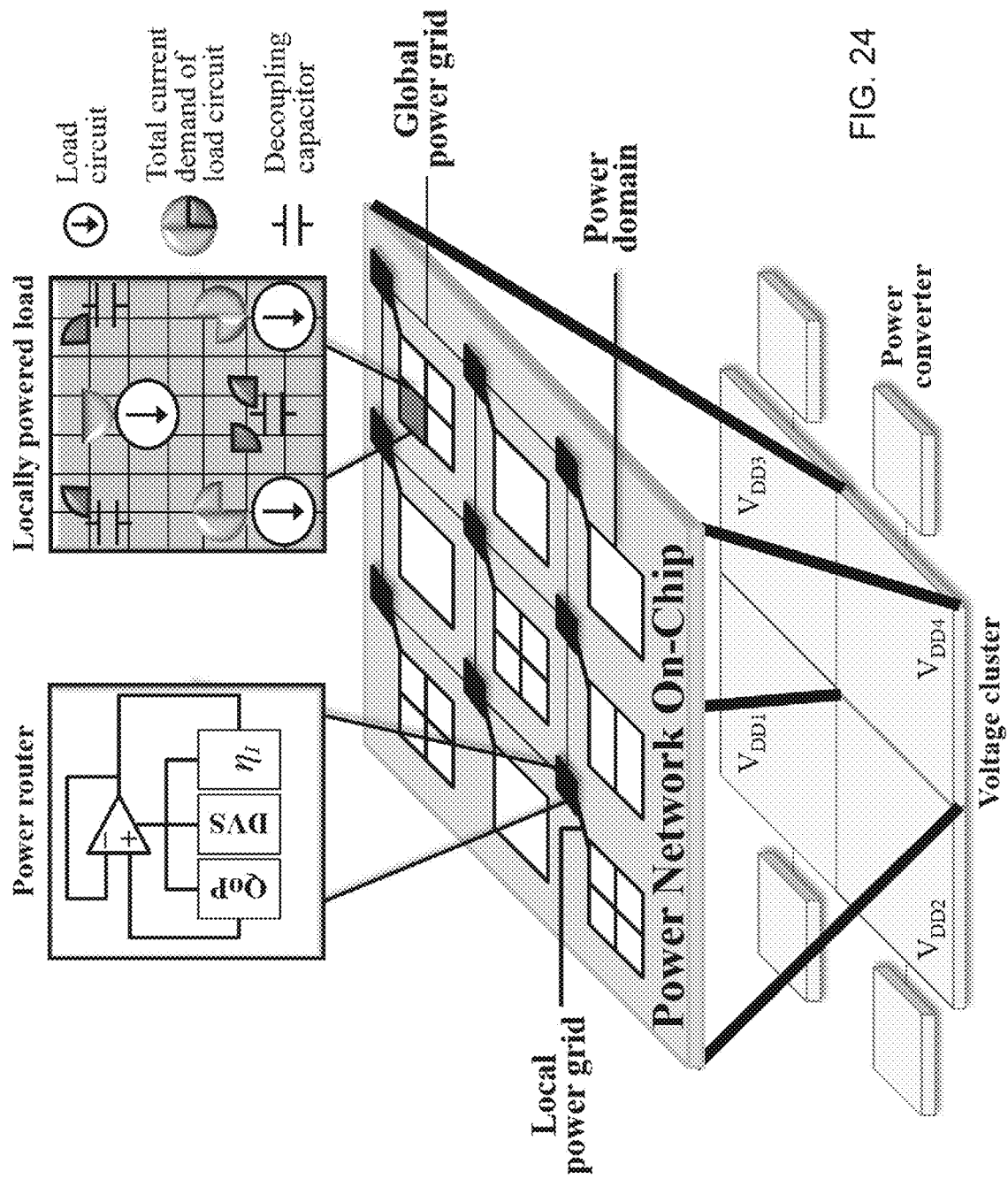
FIG. 24 shows a diagram of an on-chip power network with routers distributing the current over the power grid to the local loads.

The concept of a power network-on-chip is described herein which virtually manages the power in SoCs through specialized power routers, switches, and programmable control logic, while supporting scalable power delivery in heterogeneous ICs. A PNoC is comprised of physical links and routers that provide both virtual and physical power routing. This system senses the voltages and currents throughout the system, and manages the POL regulators through power switches. Based on the sensed voltages and currents, a programmable unit makes real-time decisions to apply a new set of configurations to the routers per time slot, dynamically managing the on-chip power delivery process. New process algorithms are used to dynamically customize the power delivery policies through a specialized microcontroller that routes the power. These algorithms satisfy real-time power and desired performance. A PNoC composed of power routers connected to global power grids and locally powered loads is illustrated in FIG. 24.

Global power from the converters is managed by the power routers, delivered to individual power domains, and regulated within the locally powered loads. These locally powered loads combine all of the current loads located within a specific on-chip power domain with the decoupling capacitors that supply the local current demand within that region. In some embodiments, to support DVS, power switches in the PNoC are dynamically controlled, connecting or disconnecting power routers within individual voltage clusters in real time. Current loads powered at similar voltage levels therefore draw current from all of the connected power routers, lessening temporary current variations. Similar to a mesh based clock distribution network

[44], the shared power supply lessens the effect of the on-chip parasitic impedances, enhancing the voltage regulation and quality of power.

The power routers and local current loads are described in more detail hereinbelow. Different PNoC topologies and specific design objectives are also considered.

A. Power Routers

Figure 25A:
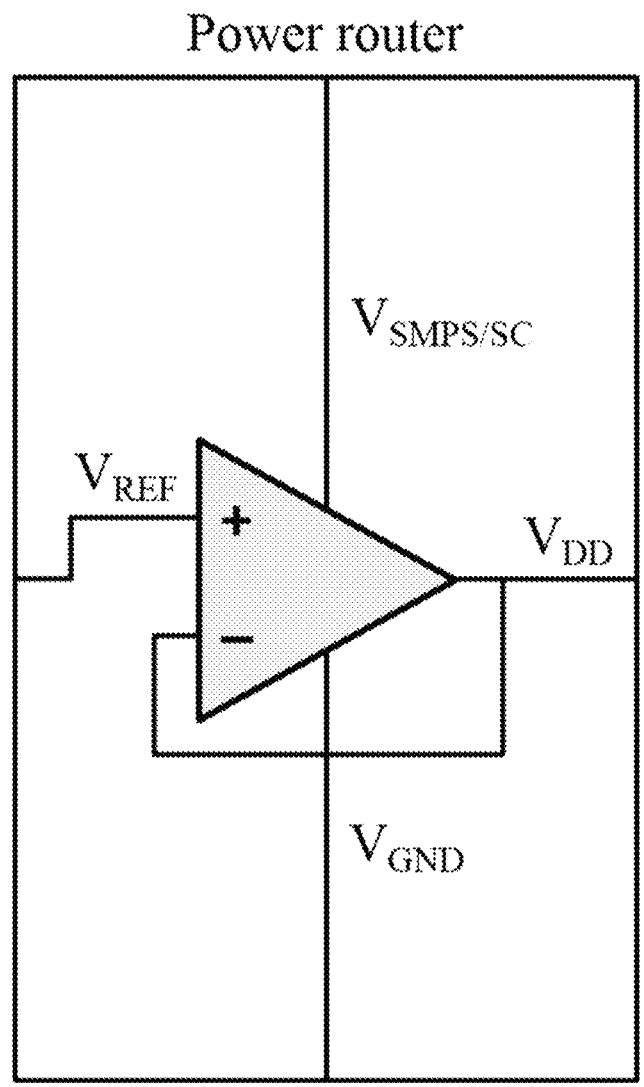
FIG. 25A shows a schematic diagram of an exemplary power router for a PNoC Simple topology with a linear voltage regulator.
Figure 25B:
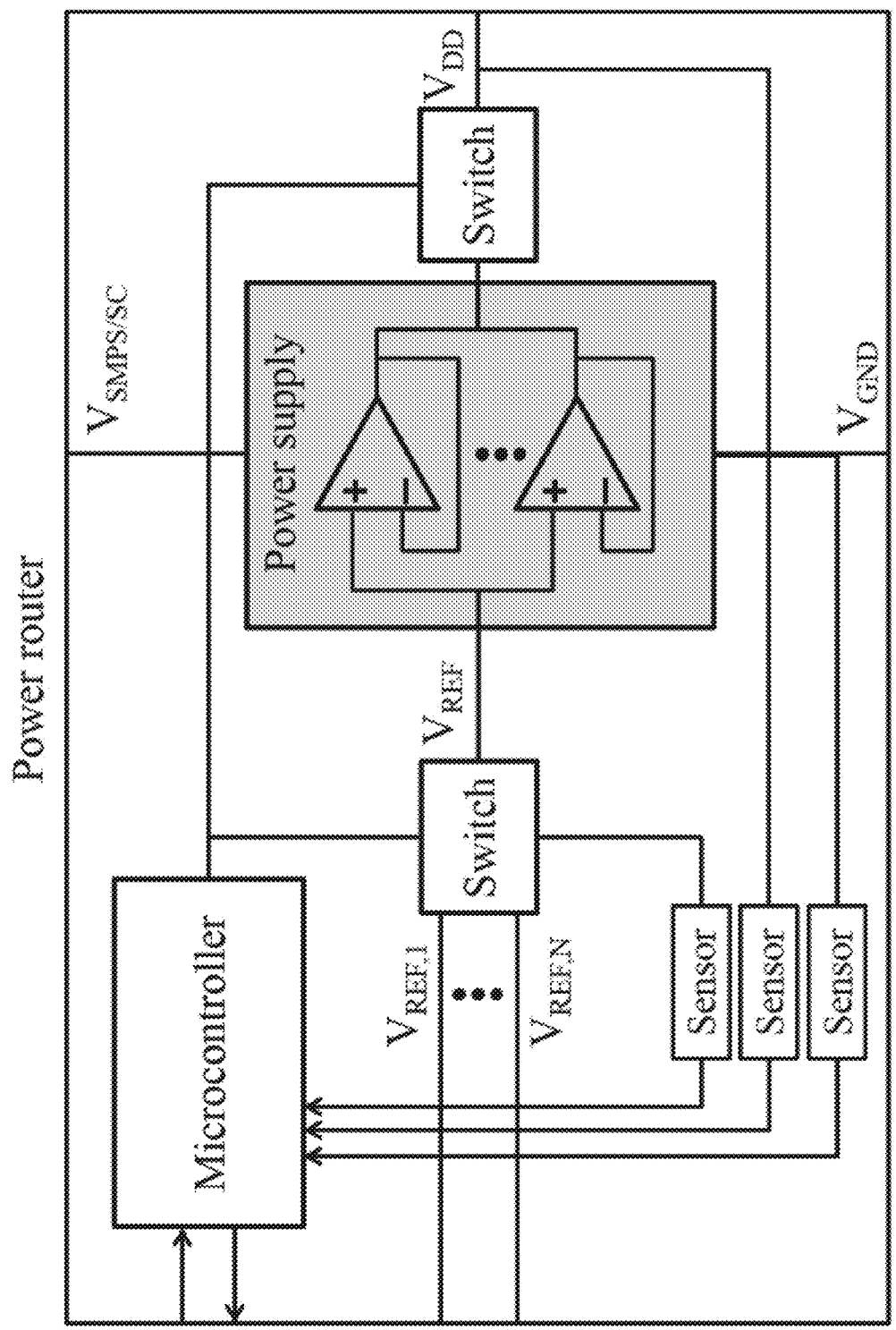
FIG. 25B shows a schematic diagram of an exemplary power router for a PNoC advanced topology with a dynamically adaptable voltage regulator and microcontroller.

The efficient management of the energy budget is dynamically maintained by the power routers. Each power domain is controlled by a single power router. A router topology ranges from a simple linear voltage regulator, shown in FIG. 25A, to a complex power delivery system, as depicted in FIG. 25B, with sensors, dynamically adaptable power supplies, switches, and a microcontroller. In one embodiment, the new structure features real-time voltage/frequency scaling, adaptable energy allocation, and precise control over the on-chip QoP. With the PNoC routers the power is managed locally based on specific local current and voltage demands, decreasing the dependency on remotely located loads and power supplies. Thus, the scalability of power delivery process is enhanced with PNoC approach.

B. Locally Powered Loads

Locally powered loads with different current demands and power budgets can be efficiently managed with PNoC as described hereinabove. The local power grids provide a specific voltage to the nearby load circuits. The highly complex interactions among the multiple power supplies, decoupling capacitors, and load circuits are considered, where the interactions among the nearby components are typically more significant. The effective region for a point-of-load power supply is the overlap of the effective regions of the surrounding decoupling capacitors [13, 6]. Loads within the same effective region are combined into a single equivalent locally powered load regulated by a dedicated LDO. All of the LDO regulators within a power domain can be controlled by a single power router. A model and closed-form expressions of the interactions among the power supplies, decoupling capacitors, and current loads are used to efficiently partition an IC with billions of loads into power domains and locally powered loads.

Part III Case Study

Figure 26:
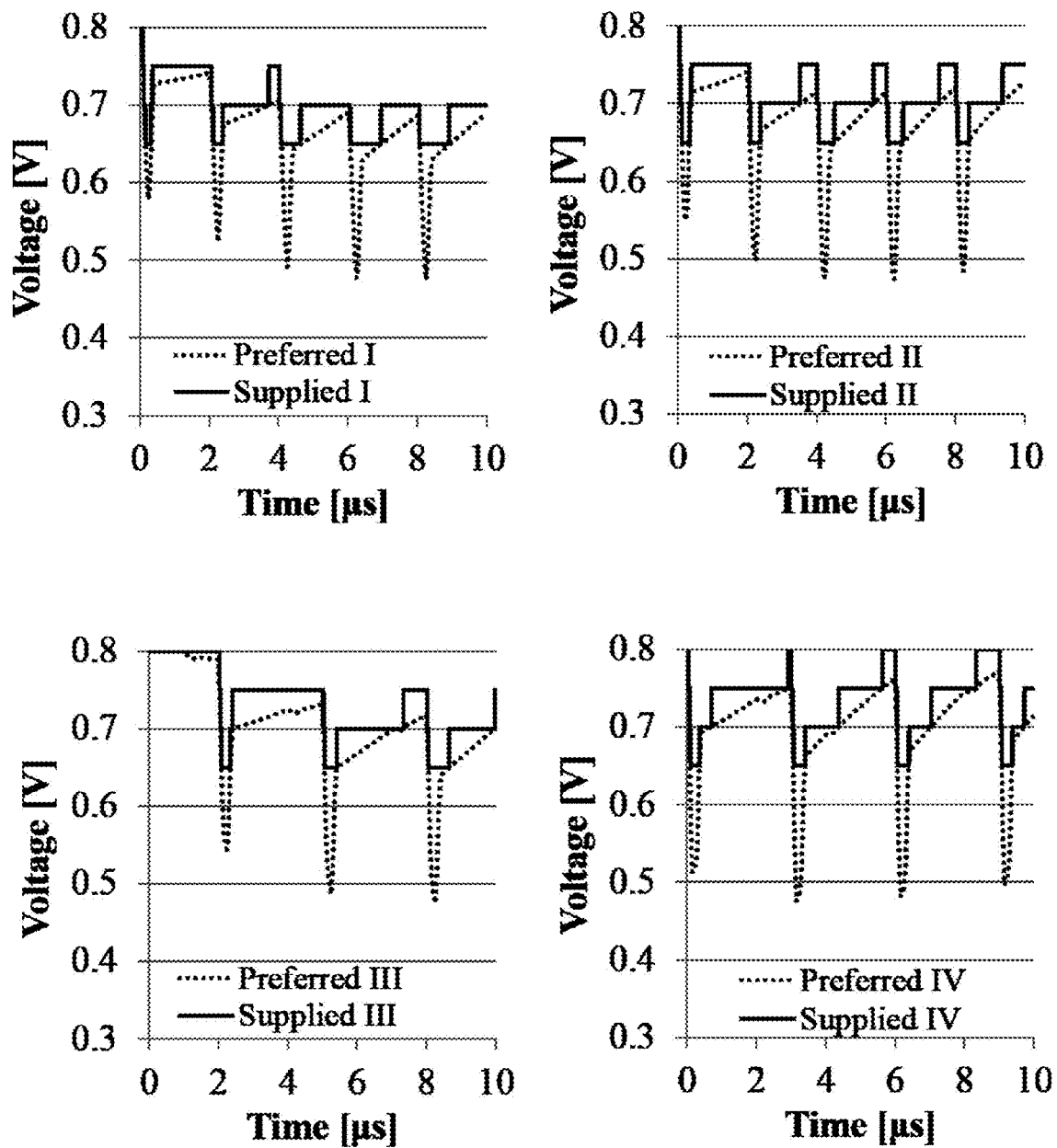
FIG. 26 shows graphs of voltage vs. time for four preferred and supplied voltage levels in PNoC with four power domains.

Example: To evaluate the performance of the power router, a PNoC with four power routers is considered, supplying power to four power domains. IBM power grid benchmarks [5] model the behavior of the individual power domains. To simulate a dynamic power supply in PNoC, the original IBM voltage profiles have been scaled to generate the target power supplies between 0.5 volts and 0.8 volts. Target voltage profiles with four voltage levels (0.8 volts, 0.75 volts, 0.7 volts, and 0.65 volts) within a PNoC are illustrated in FIG. 26. The number of power domains with each of the four supply voltages changes dynamically based on the transient power requirements of the power domains.

Figure 27:
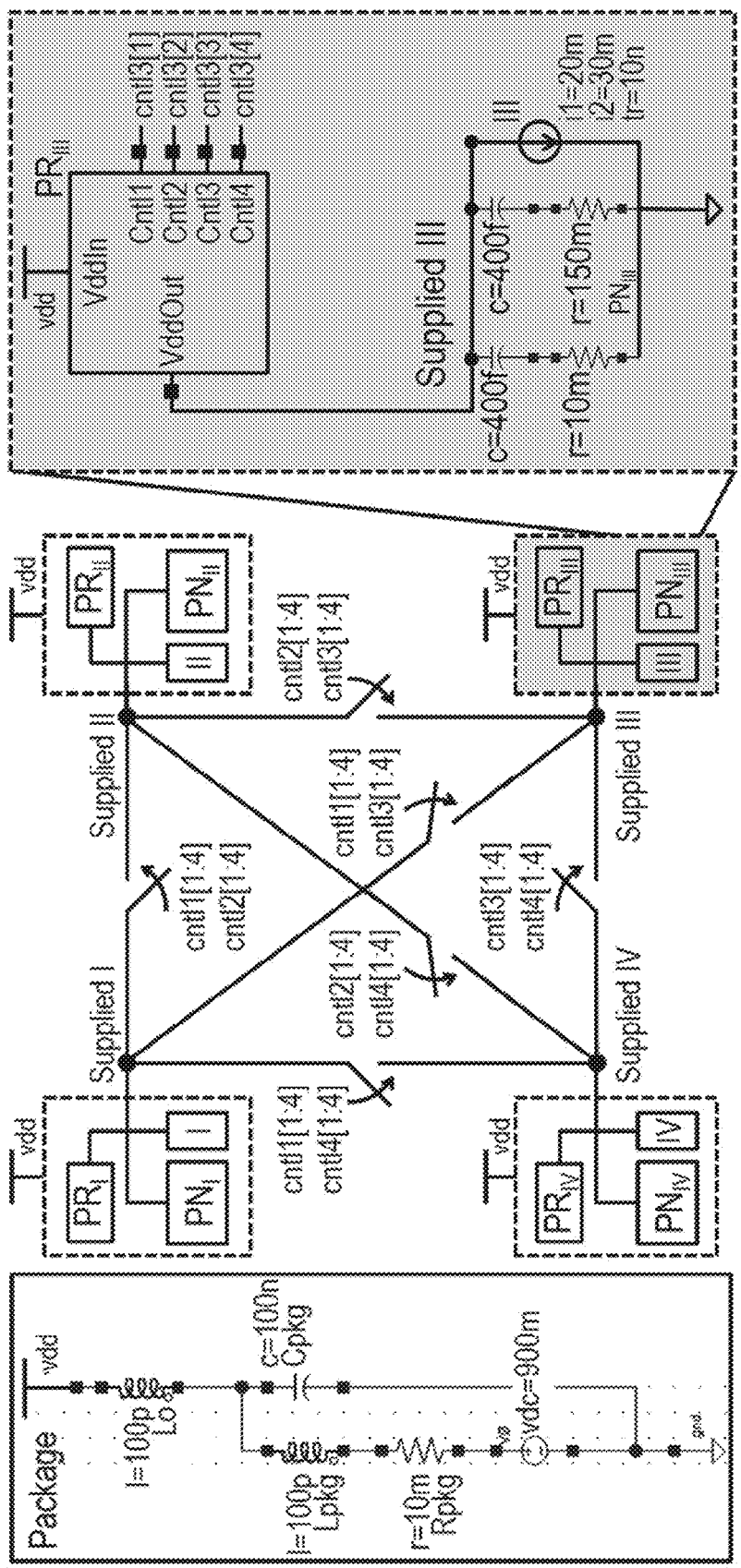
FIG. 27 shows a schematic diagram of an exemplary PNoC with four power domains and four power routers connected with control switches.

A schematic of a PNoC with four power domains (I, II, III, and IV) and four power routers ($PR_I$, $PR_{II}$, $PR_{III}$, and $PR_{IV}$) is shown in FIG. 27.

Figure 28:
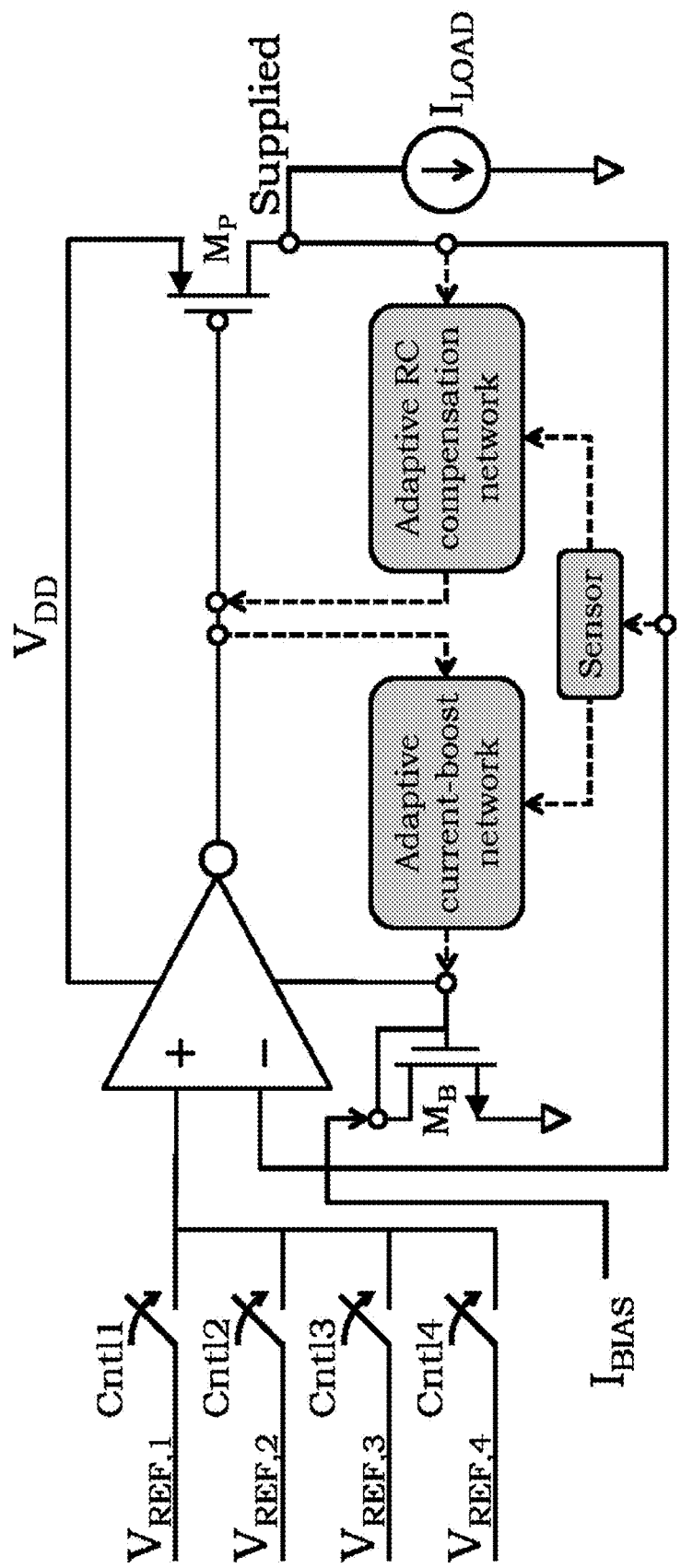
FIG. 28 shows a schematic diagram of an exemplary power router with voltage regulator, load sensor, and adaptive networks.

Each of the power routers is composed of an LDO with four switch controlled reference voltages to support dynamic voltage scaling. In addition, the power routers feature adaptive RC compensation and current boost networks controlled by load sensors to provide quality of power control and optimization, as shown in FIG. 28.

In one exemplary embodiment, the adaptive RC compensation network is comprised of a capacitive block connected in series with two resistive blocks, all digitally controlled. These RC impedances are digitally configured to stabilize the LDO within the power routers under a wide range of process variations. Those skilled in the art will appreciate that the exemplary RC compensation network described hereinabove is merely representative and that any suitable adaptive compensation network can be used with PNoC.

In one embodiment, the current boost circuit is composed of a sensor block that follows the output voltage at the drain of transistor $M_p$ (FIG. 28), and a current boost block that controls the current through the differential pair within the LDO. When a high slew rate transition at the output of the LDO occurs, the boost mode is activated, raising the tail current of the LDO differential pair. Alternatively, during regular mode, no additional current flows into the differential pair, enhancing the power efficiency of the LDO.

The power routers are connected with controlled switches to mitigate load transitions in domains with similar supply voltages. To model the RLC parasitic impedances of the package and power network, non-ideal LDO input and output impedances ($PN_I$, $PN_{II}$, $PN_{III}$, and $PN_{IV}$) are considered, as shown in FIG. 27. The load current characteristics are listed in Table 2 for each of the four domains

TABLE 2

| Output load in a PNoC with four power domains. | | | | |
|---|---|---|---|---|
| Domain | I | II | III | IV |
| Minimum output current [mA] | 10 | 75 | 20 | 20 |
| Maximum output current [mA] | 50 | 10 | 30 | 20 |
| Output transition time [ns] | 50 | 50 | 10 | N/A |

Figure 29:
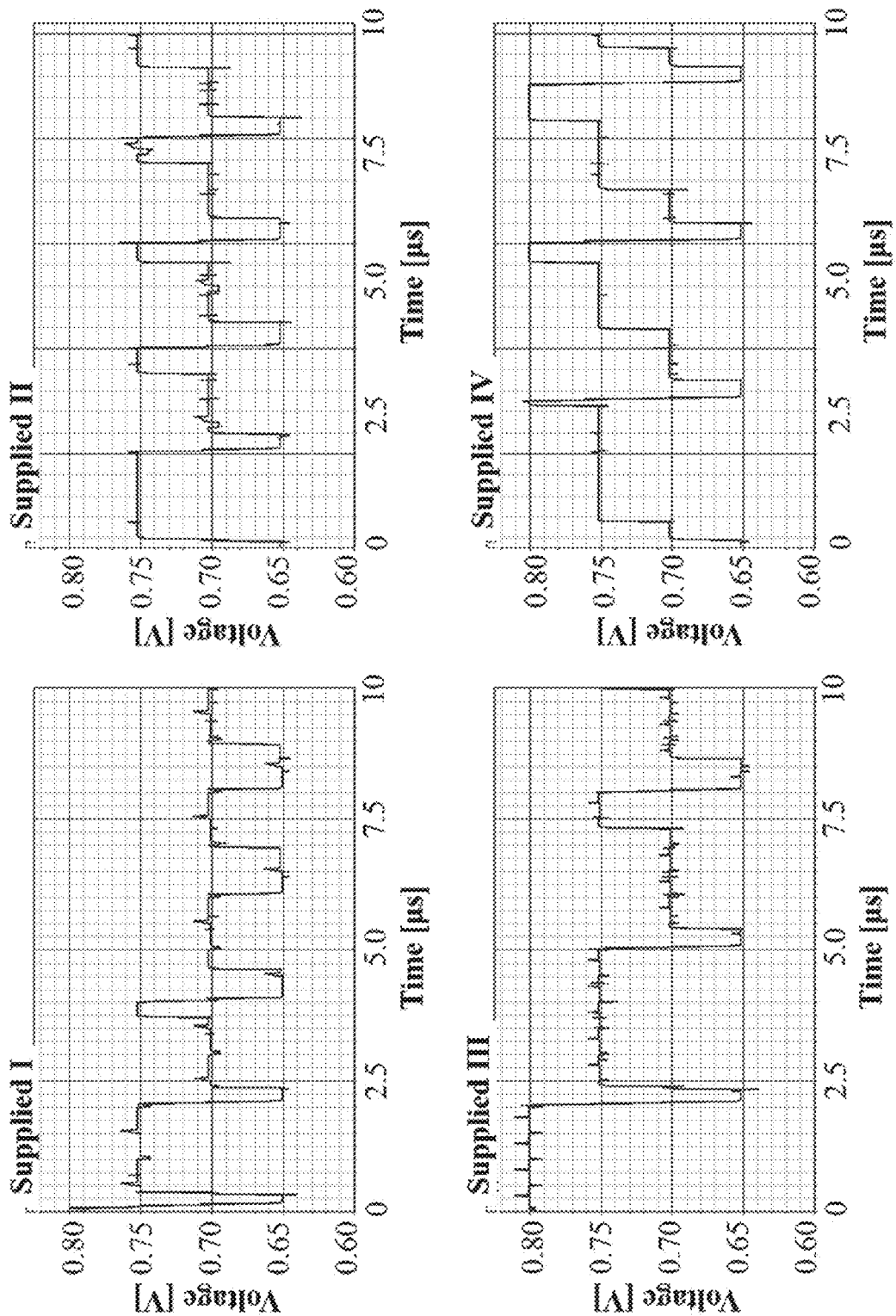
FIG. 29 shows graphs of voltage levels vs. time of the exemplary PNoC with four power domains.

The exemplary PNoC was simulated in SPICE. Simulation results are shown in the graphs of FIG. 29, exhibiting a maximum error of 0.35%, 2.0%, and 2.7% for, respectively, the steady state dropout voltage, load regulation due to output current switching, and load regulation due to dynamic PNoC reconfigurations. Good correlation with the specified power supply of FIG. 26 was demonstrated.

The power savings in each of the power domains range between 21.0% to 31.6% as compared to a system without dynamic voltage scaling. These average power savings show that the PNoC architecture can control the power supplies in real-time, optimizing the power efficiency of the overall power delivery system.

Part IV Summary

To address the issues of power delivery complexity and quality of power, a power delivery system should provide a scalable modular architecture that supports integration of additional functional blocks and power features (e.g., DVS, adaptive RC compensation, and efficiency optimization with adaptive current boost) without requiring the re-design of the power delivery system. The architecture should also support heterogeneous circuits and technologies.

The concept and architecture of an on-chip power network was described hereinabove. Important objectives of an on-chip PNoC based power delivery system include 1) to exploit the concept of on-chip networks for systematic power delivery in SoCs to reduce design complexity while increasing scalability, 2) to provide a methodology that separates power conversion and regulation for efficiently enhancing the quality of power, 3) to enable the application of local power routing through a specialized microcontroller for on-chip power management, and 4) to utilize small area power supplies as point-of-load voltage regulators.

Computer processes used to perform the heterogeneous method for energy efficient distribution of on-chip power supplies as well as software (e.g. complex power router microcontroller firmware) for a power network on-chip system for scalable power delivery can be provided on any suitable computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc. Firmware, where appropriate, can be stored, for example, on-chip in ROM, EEPROM, or any other suitable non-volatile memory structure or memory device.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] E. Salman and E. G. Friedman, *High Performance Integrated Circuit Design*, McGraw-Hill Publishers, 2012.
[2] V. Kursun and E. G. Friedman, *Multi-Voltage CMOS Circuit Design*, John Wiley & Sons Press, 2006.
[3] F. Waldron, J. Slowey, A. Alderman, B. Narveson, and S. C. O'Mathuna, "Technology Roadmapping for Power Supply in Package (PSiP) and Power Supply on Chip (PwrSoC)," *Proceedings of the IEEE Applied Power Electronics Conference and Exposition*, pp. 525-532, February 2010.
[4] S. Kose, S. Pinzon, B. McDermott, S. Tam, and E. G. Friedman, "Active Filter Based Hybrid On-Chip DC-DC Converters for Point-of-Load Voltage Regulation," *IEEE Transactions on Very Large Scale Integration (VLSI) Systems* (in press).
[5] S. Köse and E. G. Friedman, "Distributed Power Network Co-Design with On-Chip Power Supplies and Decoupling Capacitors," *Proceedings of the ACM/IEEE International Workshop on System Level Interconnect Prediction (SLIP)*, June 2011.
[6] S. Köse and E. G. Friedman, "Distributed On-Chip Power Delivery," *IEEE Journal on Emerging and Selected Topics in Circuits and Systems* (in press).
[7] S. Köse and E. G. Friedman, "Simultaneous Co-Design of Distributed On-Chip Power Supplies and Decoupling Capacitors," *Proceedings of the IEEE International SoC Conference*, pp. 15-18, September 2010.
[8] S. Kose, S. Pinzon, B. McDermott, S. Tam, and E. G. Friedman, "An Area Efficient On-Chip Hybrid Voltage Regulator," *Proceedings of the IEEE International Symposium on Quality Electronic Design*, pp. 398-403, March 2012.
[9] V. Kursun, S. G. Narendra, V. K. De, and E. G. Friedman, "Analysis of Buck Converters for On-Chip Integration with a Dual Supply Voltage Microprocessor," *IEEE Transactions on Very Large Scale Integration (VLSI) Circuits*, Vol. 11, No. 3, pp. 514-522, June 2003.
[10] V. Kursun, S. G. Narendra, V. K. De, and E. G. Friedman, "High Input Voltage Step-Down DC-DC Converters For Integration in a Low Voltage CMOS Process," *Proceedings of the IEEE International Symposium on Quality Electronics Design*, pp. 517-521, March 2004.
[11] M. Al-Shyoukh, H. Lee, and R. Perez, "A Transient-Enhanced Low-Quiescent Current Low-Dropout Regulator with Buffer Impedance Attenuation," *IEEE Journal of Solid-State Circuits*, Vol. 42, No. 8, pp. 1732-1742, August 2007.
[12] T. Y. Man, K. N. Leung, C. Y. Leung, P. K. T. Mok, and M. Chan, "Development of Single-Transistor-Control LDO Based on Flipped Voltage Follower for SoC," *IEEE Transactions on Circuits and Systems I: Regular Papers*, Vol. 55, No. 5, pp. 1392-1401, June 2008.
[13] P. Hazucha, T. Karnik, B. A. Bloechel, C. Parsons, D. Finan, and S. Borkar, "Area-Efficient Linear Regulator with Ultra-Fast Load Regulation," *IEEE Journal of Solid-State Circuits*, Vol. 40, No. 4, pp. 933-940, April 2005.
[14] J. Guo and K. N. Leung, "A 6-μW Chip-Area-Efficient Output-Capacitorless LDO in 90-nm CMOS Technology," *IEEE Journal of Solid-State Circuits*, Vol. 45, No. 9, pp. 1896-1905, September 2010.
[15] M. Wens and M. S. J. Steyaert, "A Fully Integrated CMOS 800-mW Fourphase Semiconstant ON/OFF-Time Step-Down Converter," *IEEE Transactions on Power Electronics*, Vol. 26, No. 2, pp. 326-333, February 2011.
[16] H. Nam, Y. Ahn, and J. Roh, "5-V Buck Converter Using 3.3-V Standard CMOS Process With Adaptive Power Transistor Driver Increasing Efficiency and Maximum Load Capacity," *IEEE Transactions on Power Electronics*, Vol. 27, No. 1, pp. 463-471, January 2012.
[17] L. Wang, Y. Pei, X. Yang, Y. Qin, and Z. Wang, "Improving Light and Intermediate Load Efficiencies of Buck Converters With Planar Nonlinear Inductors and Variable On Time Control," *IEEE Transactions on Power Electronics*, Vol. 27, No. 1, pp. 342-353, January 2012.
[18] W. Yan, W. Li, and R. Liu, "A Noise-Shaped Buck DC-DC Converter with Improved Light-Load Efficiency and Fast Transient Response," *IEEE Transactions on Power Electronics*, Vol. 26, No. 12, pp. 3908-3924, December 2011.
[19] H. Jia, J. Lu, X. Wang, K. Padmanabhan, and Z. J. Shen, "Integration of a Monolithic Buck Converter Power IC and Bondwire Inductors with Ferrite Epoxy Glob Cores," *IEEE Transactions on Power Electronics*, Vol. 26, No. 6, pp. 1627-1630, June 2011.
[20] Y.-H. Lee, S.-C. Huang, S.-W. Wang, W.-C. Wu, P.-C. Huang, H.-H. Ho, Y.-T. Lai, and K.-H. Chen, "Power-Tracking Embedded Buck-Boost Converter with Fast Dynamic Voltage Scaling for the SoC System," *IEEE Transactions on Power Electronics*, Vol. 27, No. 3, pp. 1271-1282, March 2012.
[21] Y. Ahn, H. Nam, and J. Roh, "A 50-MHz Fully Integrated Low-Swing Buck Converter Using Packaging Inductors," *IEEE Transactions on Power Electronics*, Vol. 27, No. 10, pp. 4347-4356, October 2012.
[22] M. Bathily, B. Allard, and F. Hasbani, "A 200-MHz Integrated Buck Converter With Resonant Gate Drivers for an RF Power Amplifier," *IEEE Transactions on Power Electronics*, Vol. 27, No. 2, pp. 610-613, February 2012.
[23] Y. Ramadass, A. Fayed, and A. Chandrakasan, "A Fully-Integrated Switched-Capacitor Step-Down DC-DC Converter With Digital Capacitance Modulation in 45 nm CMOS," *IEEE Journal of Solid-State Circuits*, Vol. 45, No. 12, pp. 2557-2565, December 2010.
[24] H.-P. Le, S. R. Sanders, and E. Alon, "Design Techniques for Fully Integrated Switched-Capacitor DC-DC Converters," *IEEE Journal of Solid-State Circuits*, Vol. 46, No. 9, pp. 2120-2131, September 2011.
[25] R. W. Erickson and D. Maksimovic, *Fundamentals of Power Electronics*. Kluwer Academic Publishers, 2001.
[26] C. O'Mathuna, N. Wang, S. Kulkarni, and S. Roy, "Review of Integrated Magnetics for Power Supply on Chip (PwrSoC)," *IEEE Transactions on Power Electronics*, Vol. 27, No. 1, pp. 4799-4816, November 2012.

[27] F. Wei and A. Fayed, "A Feasibility Study of High-Frequency Buck Regulators in Nanometer CMOS Technologies," *Proceedings of the IEEE Dallas Circuits and Systems Workshop*, pp. 1-4, October 2009.

[28] D. Lu and C. P. Wong, *Materials for Advanced Packaging*, Springer, 2008.

[29] Johanson Technology. Integrated Passive Components. Available online: http://www.johansontechnology.com/images/stories/catalog/JTI_CAT_2012.pdf.

[30] Vishay. Passive Components. Available online: http://www.vishay.com/power-ics/step-down-regulators.

[31] International Technology Roadmap for Semiconductors. Available online: www.itrs.net/Links/2011ITRS/2011Tables/PIDS_2011 Tables.xlsx

[32] S. Bhunia, and S. Mukhopadhyay, *Low-Power Variation-Tolerant Design in Nanometer Silicon*, Springer, 2011.

[33] R. G. Dreslinski, M. Wieckowski, D. Blaauw, D. Sylvester, and T. Mudge, "Near-Threshold Computing: Reclaiming Moore's Law Through Energy Efficient Integrated Circuits," *Proceedings of the IEEE*, Vol. 98, No. 2, pp. 253-266, February 2010.

[34] K. Ishida, Y. Ryu, Xin Zhang, Po-Hung Chen, K. Watanabe, M. Takamiya, and T. Sakurai, "0.5-V Input Digital LDO with 98.7% Current Efficiency and 2.7-µA Quiescent Current in 65 nm CMOS," *Proceedings of the IEEE Custom Integrated Circuits Conference*, pp. 1-4, September 2010.

[35] K. Hirairi, Y. Okuma, H. Fuketa, T. Yasufuku, M. Takamiya, M. Nomura, H. Shinohara, and T. Sakurai, "13% Power Reduction in 16b Integer Unit in 40 nm CMOS by Adaptive Power Supply Voltage Control with Parity-Based Error Prediction and Detection (PEPD) and Fully Integrated Digital LDO," *Proceedings of the IEEE International Solid-State Circuits Conference*, pp. 486-488, February 2012.

[36] R. Urgaonkar, U. C. Kozat, K. Igarashi, and M. J. Neely, "Dynamic Resource Allocation and Power Management in Virtualized Data Centers," *Proceedings of the IEEE Network Operations and Management Symposium*, pp. 479-486, April 2010.

[37] C. P. Robert and G. Casella, *Monte Carlo Statistical Methods*, Springer, 1999.

[38] P. Hazucha et al., "A 233-MHz 80%-87% Efficient Four-Phase DC-DC Converter Utilizing Air-Core Inductors on Package," IEEE Journal of Solid-State Circuits, Vol. 40, No. 4, pp. 838-845, April 2005.

[39] J. Kim et al., "Chip-Package Hierarchical Power Distribution Network Modeling and Analysis Based on a Segmentation Method," IEEE Transactions on Advanced Packaging, Vol. 33, No. 3, pp. 647-659, August 2010.

[40] S. Kose and E. G. Friedman, "Distributed On-Chip Power Delivery," IEEE Journal on Emerging and Selected Topics in Circuits and Systems, Vol. 2, No. 4, pp. 704-713, December 2012.

[41] S. Kose, S. Tam, S. Pinzon, B. McDermott, and E. G. Friedman, "Active Filter Based Hybrid On-Chip DC-DC Converters for Point-of-Load Voltage Regulation," IEEE Transactions on Very Large Scale Integration (VLSI) Circuits, Vol. 21, No. 4, pp. 680-691, April 2013.

[42] S. R. Nassif, "Power Grid Analysis Benchmarks," *Proceedings of the IEEE/ACM Asia and South Pacific Design Automation Conference*, pp. 376-381, January 2008.

[43] M. Popovich, M. Sotman, A. Kolodny, and E. G. Friedman, "Effective Radii of On-Chip Decoupling Capacitors," IEEE Transactions on Very Large Scale Integration (VLSI) Circuits, Vol. 16, No. 7, pp. 894-907, July 2008.

[44] P. J. Restle et al., "A clock distribution network for microprocessors," IEEE Journal of Solid-State Circuits, Vol. 36, No. 5, pp. 792-799, May 2001.

[45] I. Vaisband and E. G. Friedman, "Heterogeneous Methodology for Energy Efficient Distribution of On-Chip Power Supplies," IEEE Transactions on Power Electronics, Vol. 28, No. 9, pp. 4267-4280, September 2013.

What is claimed is:

1. A power network on-chip (PNoC) for an integrated circuit comprising:

one or more voltage clusters, each voltage cluster comprising:

a plurality of locally powered loads;

a plurality of power routers disposed in a mesh circuit topology as a mesh of power routers, said mesh of power routers configured to receive power from one or more power converters, each of said power routers electrically coupled to and configured to power a locally powered load, adjacent power routers of said plurality of power routers electrically coupled to each other via a switch of a plurality of switches; and at least one programmable unit communicatively coupled to said plurality of switches, said programmable unit adapted to manage power delivery to said locally powered loads of said one or more voltage clusters by configuring a switch position of at least a subset of switches of said plurality of switches based on sensed voltages and currents within said one or more voltage clusters.

2. The PNoC of claim 1, wherein said programmable unit is configured to apply a new set of said switch positions substantially in real-time on a time-slot basis.

3. The PNoC of claim 1, wherein said at least one programmable unit comprises a microcontroller disposed on said integrated circuit.

4. The PNoC of claim 1, wherein one or more power routers of said plurality of power routers is a complex power delivery system comprising one or more sensors, one or more dynamically adaptable power supplies, one or more switches and a microcontroller configured to control said one or more dynamically adaptable power supplies and said one or more switches in response to measurements based on said one or more sensors.

5. A heterogeneous power distribution system for an integrated circuit comprising:

a power network-on-chip (PNoC) configured to receive electrical power from one or more off-chip power converters, said power network-on-chip comprising a mesh of power routers electrically coupled to and configured to power a plurality of on-chip loads, said mesh of power routers including:

a plurality of integrated simple power routers; and a plurality of integrated complex power routers, each complex power router of said plurality of complex power routers comprising a microcontroller communicatively coupled to one or more switches and one or more sensors of said complex power router, said microcontroller configured to run a process algorithm that dynamically routes and controls power according to a power delivery policy by controlling said one or more switches based on information received from said one or more sensors.

6. The power distribution system of claim 5, wherein each power domain of a plurality of power domains is controlled by a power router of said mesh of power routers.

7. The power distribution system of claim 5, wherein one or more of said plurality of integrated simple power routers comprises a linear voltage regulator.

8. The power distribution system of claim 7, wherein at least one complex power router controls a plurality of linear low dropout regulators within a common power domain.

9. The power distribution system of claim 5, wherein said power network-on-chip receives a converted electrical power from a plurality of off-chip switching power converters and delivers a regulated electrical power to a plurality of on-chip voltage clusters.

10. The power distribution system of claim 5, wherein said power network-on-chip comprises one or more real-time dynamic voltage scaling circuits.

11. The power distribution system of claim 5, wherein said power network-on-chip comprises one or more real-time dynamic frequency scaling circuits.

12. The power distribution system of claim 5, wherein said power network-on-chip comprises one or more real-time adaptable energy allocation circuits.

13. The power distribution system of claim 5, wherein said power network-on-chip comprises one or more adaptive RC compensation networks.

14. The power distribution system of claim 13, wherein said RC compensation network comprises a capacitive block electrically coupled to two series resistive blocks, said capacitive block and said two series resistive blocks digitally controlled and digitally configured to stabilize a linear regulator under a wide range of process variations.

15. The power distribution system of claim 5, wherein said power network-on-chip comprises one or more adaptive current boost networks.

16. The power distribution system of claim 15, wherein at least one of said one or more adaptive current boost networks is electrically coupled to and controls a current through a differential pair of a linear regulator, and
wherein when a high slew rate transition at an output of said linear regulator occurs, a boost mode is activated, raising a tail current of said differential pair, or alternatively, during a regular mode causing substantially no additional current flow into said differential pair, enhancing a power efficiency of said linear regulator.

17. The power distribution system of claim 5, wherein said power network-on-chip controls an on-chip quality of power factor.

18. A method to determine a near optimal distribution of power supply resources in a heterogeneous power delivery system comprising the steps of:
providing an electronic system programmed to distribute power supply resources in said heterogeneous power delivery system;
accepting by computer process a set of voltage domain information including a number N of on-chip voltage domains and a voltage V and current load I for each of said on-chip voltage domains and a maximum number $N_{S,MAX}$ of off-chip switching mode power supplies;
calculating by a computer process that is more computationally efficient than an exhaustive optimal computation by use of at least a selected one of: a binary power supply clustering process and a linear power supply clustering process, based on said set of voltage domain information and said maximum number $N_{S,MAX}$ of off-chip switching mode power supplies, a near optimal set of voltage clusters comprising a number and distribution of linear low dropout regulators associated with each cluster, said linear low dropout regulators configured to power each of said on-chip voltage domains; and
configuring said electronic system to said near optimal distribution of power supply resources based on said near optimal set of voltage clusters.

19. The method of claim 18, further comprising at each step of said binary power supply clustering process a step of identifying a specific voltage cluster having a widest voltage range and distributing one or more of said linear low dropout regulators into two separate clusters.

20. The method of claim 18, wherein said linear power supply clustering process linearly distributes a plurality of linear low dropout regulators within said voltage clusters.

* * * * *

UNITED STATES PATENT AND TRADEMARK OFFICE
CERTIFICATE OF CORRECTION

PATENT NO. : 9,785,161 B2
APPLICATION NO. : 14/833805
DATED : October 10, 2017
INVENTOR(S) : Inna Vaisband et al.

It is certified that error appears in the above-identified patent and that said Letters Patent is hereby corrected as shown below:

On the Title Page

After the paragraph at item (65) entitled Prior Publication Data, insert:
--Related U.S. Application Data Provisional application no. 62/042,572, filed on August 27, 2014.--

Signed and Sealed this
Twenty-seventh Day of February, 2018

Andrei Iancu
*Director of the United States Patent and Trademark Office*